(12) United States Patent
Emerson et al.

(10) Patent No.: US 12,455,561 B2
(45) Date of Patent: Oct. 28, 2025

(54) UTILIZING GRAPHICAL USER INTERFACE TO GENERATE PROCESS AUTOMATION ALARMS FOR DISTRIBUTED CONTROL NODES

(71) Applicant: Yokogawa Electric Corporation, Tokyo (JP)

(72) Inventors: David Emerson, Coppell, TX (US); Patrick Clay, Frisco, TX (US); Vien Nguyen, Frisco, TX (US); Hidenori Sawahara, Spring, TX (US)

(73) Assignee: Yokogawa Electric Corporation, Tokyo (JP)

( * ) Notice: Subject to any disclaimer, the term of this patent is extended or adjusted under 35 U.S.C. 154(b) by 393 days.

(21) Appl. No.: 18/090,342

(22) Filed: Dec. 28, 2022

(65) Prior Publication Data
US 2024/0219896 A1   Jul. 4, 2024

(51) Int. Cl.
 *G05B 23/02* (2006.01)
(52) U.S. Cl.
 CPC .............. *G05B 23/0208* (2013.01)
(58) Field of Classification Search
 None
 See application file for complete search history.

(56) References Cited

U.S. PATENT DOCUMENTS

| 6,205,362 | B1 | 3/2001 | Eidson |
| 7,551,072 | B2 | 6/2009 | Tambascio et al. |
| 10,410,493 | B2 | 9/2019 | Rischar et al. |
| 11,650,892 | B1 | 5/2023 | Joyner |
| 2008/0125877 | A1* | 5/2008 | Miller .............. G05B 15/02 707/999.107 |
| 2012/0310381 | A1 | 12/2012 | Karaffa et al. |
| 2016/0065656 | A1 | 3/2016 | Patin et al. |
| 2018/0077109 | A1 | 3/2018 | Hoeme et al. |
| 2018/0109955 | A1 | 4/2018 | Nixon et al. |

(Continued)

FOREIGN PATENT DOCUMENTS

| CN | 111416731 | 7/2020 |
| CN | 111508214 | 8/2020 |

(Continued)

OTHER PUBLICATIONS

International Search Report and Written Opinion issued for Application No. PCT/IB2023/06299, 8 pages, dated Mar. 19, 2024.

*Primary Examiner* — Carlos R Ortiz Rodriguez
(74) *Attorney, Agent, or Firm* — Gray Ice Higdon

(57) ABSTRACT

Implementations relate to providing an alarm configuration GUI via which a user can interact in defining corresponding alarms for corresponding function block identifiers of a process automation system. For example, a user can interact with the alarm configuration GUI in selecting a function block identifier and in defining parameter(s) for an alarm configuration file to be assigned to the function block identifier. Some implementations additionally or alternatively relate to transmitting the alarm configuration file to a DCN, for local utilization by the DCN in alarm monitoring based on a function block having the function block identifier. The transmitting can be responsive to determining that the DCN implements local alarm monitoring based on the function block, and the alarm configuration file being assigned to the function block identifier.

21 Claims, 11 Drawing Sheets

(56)  References Cited

U.S. PATENT DOCUMENTS

| | | |
|---|---|---|
| 2019/0102401 A1 | 4/2019 | Neel et al. |
| 2019/0355228 A1 | 11/2019 | Rischar et al. |
| 2021/0064004 A1 | 3/2021 | Kurokawa |
| 2022/0011756 A1 | 1/2022 | Hoernicke et al. |
| 2022/0086037 A1 | 3/2022 | Gehberger et al. |
| 2022/0303338 A1 | 9/2022 | Nguyen et al. |
| 2022/0308542 A1 | 9/2022 | Clay et al. |
| 2022/0308555 A1 | 9/2022 | Malm et al. |
| 2022/0311700 A1 | 9/2022 | Wang et al. |

FOREIGN PATENT DOCUMENTS

| | | |
|---|---|---|
| JP | 2002055713 | 2/2002 |
| JP | 2002062933 | 2/2002 |
| JP | 2002149232 | 5/2002 |
| JP | 2005531826 | 10/2005 |

* cited by examiner

560A

| FB IDENTIFIER | Enter FB Identifier 561A |
|---|---|

562A → *FB Identifiers With Unconfigured Alarms*
563A → *All FB Identifiers*
564A → *FB Identifiers With Recent Changes*

| FB IDENTIFIER | FT202.PV 561B |
|---|---|

| DCN IDENTIFIER: QR22 567B1 | ALARM1 (RATE OF CHANGE \| INPUT V1) 565B1 |
| | ALARM2 (LEVEL \| INPUT V1) 565B2 |
| | ALARM3 (DEVIATION \| INPUT V1) 565B3 |
| | CREATE NEW ALARM 566B |

FIG. 5B

UTILIZING GRAPHICAL USER INTERFACE TO GENERATE PROCESS AUTOMATION ALARMS FOR DISTRIBUTED CONTROL NODES

BACKGROUND

Alarms are utilized in process automation systems to detect potential anomalies and to cause action(s) to be performed responsive to detecting a potential anomaly. A potential anomaly can be one with the process automation system and/or one with the process automation process for which the process automation system is deployed. The action(s) for an alarm can include, for example, causing a corresponding notification to be rendered at interface(s) monitored by operator(s) and/or automatically causing remediation(s) to be performed (e.g., an automation process or sub-process automatically halted or throttled). As an example, an alarm can be configured to monitor sensor readings, from a sensor of the process automation system, and to cause a corresponding notification to be rendered if the sensor readings are above a high value (and/or a high-high value) and/or are below a low value (and/or a low-low value).

In some process automation systems, hardware and/or software of process automation control nodes, of the process automation system, can all be supplied and/or managed by a single entity (e.g., a single company). This enables the single entity to utilize its own proprietary techniques to create and manage alarms that are associated with corresponding process automation control nodes.

However, other process automation systems include heterogeneous hardware and/or heterogeneous software that are supplied and/or managed by a plurality of entities and/or that are deployed in a distributed manner. For example, a process automation system can include some process automation control nodes that are supplied and/or managed by a first entity, other process automation control nodes that are supplied and/or managed by a second entity, etc. Each process automation control node can have different hardware and/or software specifications, including different function block(s) that define control(s) performed by the process automation control node.

A process automation control node can include a distributed control node (DCN) that includes hardware (e.g., processor(s), memory, network interface(s), input and/or output port(s), and/or other hardware) as well as software (e.g., function block(s)) that is executed by at least some of the hardware. For example, the software can be included in memory of the DCN and can be executed by processor(s) of the DCN. The software of a DCN can, for example, utilize data from input port(s) of the DCN and/or data from other DCN(s) during execution and/or can generate output for providing over output port(s) and/or a network interface (e.g., transmitting to one or more endpoint(s) via a process automation network of the process automation system).

SUMMARY

Various technical challenges are presented in generating, updating, and/or deploying process automation alarms in a process automation system that includes distributed and/or heterogeneous hardware and/or software. For example, a process automation alarm can require monitoring, by an alarm engine, of process variable(s) of particular function block(s), such as input variable(s), output variable(s), and/or internal variable(s) of the particular function block(s). The DCN(s) generating and/or enabling access to process variable(s) must be accessible to the alarm engine to enable monitoring of those process variable(s) by the alarm engine. Further, the alarm engine must have access to and utilize appropriate alarm configuration file(s) in monitoring for occurrence of corresponding alarm condition(s) and causing corresponding action(s) to occur in response. An alarm configuration file can define condition(s), for corresponding process variable(s) that, when satisfied, cause the alarm engine to initiate corresponding action(s). Yet further, when the action(s) include initiating rendering (e.g., visual and/or audible rendering) of corresponding output at an alarm viewer, establishment of a connection-oriented connection between the alarm engine and the alarm viewer may be required or desired. However, due to the distributed and/or heterogeneous nature of the process automation system, achieving one or more of such requirements can be cumbersome and/or error prone.

As one example, assume that an alarm configuration file is locally stored on a particular DCN and is being utilized, by a local alarm engine of the particular DCN, in monitoring process variable(s) of a particular function block on the particular DCN (e.g., monitoring values for those variable(s) during execution of the particular function block). Further assume that the alarm configuration file is locally stored and utilized by the particular DCN based on being pre-loaded on the particular DCN (prior to commissioning of the DCN in the process automation system) or based on being manually configured via a human-machine interface (HMI) coupled to the DCN during commissioning. If the particular DCN is replaced with a new DCN, executing the same function block(s), it can require manual pre-loading of the alarm configuration file on the new DCN or manually configuring the new DCN via the HMI. Likewise, if the particular function block and/or the alarm engine are removed from the particular DCN and newly implemented on an alternative DCN, manual reassigning of the alarm configuration file to the alternate DCN can be required. In addition to manual reassigning being cumbersome and requiring utilization of computing resource(s), error(s) in the manual reassigning can result in corresponding alarm(s) not being truly active or not being accurate (e.g., due to incorrect condition(s) being defined). This results in lack of monitoring for occurrence of the condition(s) of the alarm(s), and lack of any corresponding action(s) being taken—which can result in hazardous conditions or other negative consequences in the process automation setting.

As another example, upon initial commissioning of DCNs of a process automation system there can be hundreds or thousands of alarm configuration files that need to be generated and/or deployed at appropriate DCNs for effective alarm monitoring. However, due to the distributed and/or heterogeneous nature of the process automation system, it can be cumbersome and/or error prone to determine which DCN is the appropriate DCN for a corresponding alarm configuration file, to ensure alarm configuration files for all desired alarms are in fact deployed and active, and/or to update an alarm (e.g., by generating and deploying a new alarm configuration file). For example, it may not be readily apparent, out of hundreds or thousands of DCNs, which DCN's alarm engine will be tasked with utilizing a corresponding alarm configuration file. Manually locating the appropriate DCN can be cumbersome and/or error prone, which can result in the corresponding alarm configuration file being deployed to the wrong DCN and corresponding alarm monitoring not being truly active. As yet another example, after initial commissioning of the process automation system, there can be a desire to update one or more alarm configuration files to achieve more effective alarm monitoring. However, determining which DCN(s) utilize the alarm configuration file(s) that are to be updated can likewise be cumbersome and/or error prone. For example, updating the alarm configuration file at a particular DCN can require physically locating the particular DCN and utilizing an HMI, directly coupled to the DCN, to update the alarm configuration file.

Implementations disclosed herein address these and other challenges by assigning, in an alarms database accessible via a process automation network, each alarm to a corresponding function block identifier. The function block identifier assigned to an alarm can be an alias of the function block corresponding to the alarm, and can be unique relative to the aliases of all other function blocks of the process automation system. The assignment of an alarm to the function block identifier can be an assignment of an alarm configuration file to the function block identifier. Further, the assignment of the alarm to the function block identifier can be in addition to (or in lieu of) any assignment of the alarm to a corresponding DCN identifier, such as network addressable identifier of the DCN (e.g., an IP address or a MAC address of the DCN).

For example, a given function block can have a function block identifier of "FT101.PV". The function block identifier "FT101.PV" can be generated by a programmer of the given function block when creating the given function block, or can be automatically created, and can be created or generated so that it is unique relative to all other function block identifiers of all other function blocks of the process automation system. In some implementations, part of the function block identifier can indicate a type of the function block and can conform to a standardized type designation scheme. For example, "PV" in "FT101.PV" can indicate the function block is of a "process variable" type. Also, for example, ".AI" can indicate a function block of an "analog input" type, ".AO" can indicate a function block of an "analog output" type, and/or ".PID" can indicate a function block of a "proportional-integral-derivative" type. In some of those or other implementations, at least part of the function block identifier may not conform to any standardized designation scheme, but may be semantically meaningful and/or conform to a non-standardized designation scheme of programmer(s) and/or an entity (or entities) implementing the process automation system. "FT101", in "FT101.PV", is an example of such a part of a function block identifier. For example, in a process automation system there may be multiple function block identifiers that end in ".PV". However, only one of those will include "FT101" before the ".PV" and, further, all of those will include unique character(s), relative to one another, before the ".PV".

An alarm configuration file, assigned to the given function block, can be generated and can dictate parameter(s) for an alarm such as condition(s), of process variable(s) of the given function block, and corresponding action(s) that should occur if the condition(s) are satisfied. For example, an alarm configuration file for "FT101.PV" can dictate condition(s), of a process variable of "FT101.PV", and can dictate descriptor(s) or other notification(s) that should be presented (e.g., in an alarm viewer) if corresponding condition(s) are satisfied. For instance, the condition(s) can include the process variable exceeding a threshold rate of change over a specified time, or can include the process variable being out of range of high-high, high, low, and/or low-low setpoint value(s).

Implementations further address the aforementioned and/or other technical challenges by providing an alarm configuration graphical user interface (GUI) system that implements an alarm configuration GUI. A user (e.g., an engineer or other human operator) can interact with the alarm configuration GUI in defining corresponding alarms for corresponding function block identifiers of a process automation system. For example, a user can interact with the alarm configuration GUI in selecting a function block identifier and in defining parameter(s) for an alarm configuration file. The parameter(s), defined via interaction with the alarm configuration GUI, can include, for example: condition(s) for corresponding process variable(s) of the function block; descriptor(s) or other notification(s) that should be presented (e.g., in an alarm viewer) if corresponding condition(s) are satisfied; severity level(s) for the condition(s); and/or other parameter(s). The parameter(s) defined through the alarm configuration GUI can be used to generate a corresponding alarm configuration file. Further, the function block identifier defined through the alarm configuration GUI can be used to store an association of the alarm configuration file to the function block identifier. Yet further, the generated alarm configuration file can be transmitted to a corresponding DCN responsive to determining that the corresponding DCN locally utilizes, in alarm monitoring, the function block that is identified by the function block identifier stored in association with the alarm configuration file. The DCN can, after receiving the generated alarm configuration file, implement local alarm monitoring based on the alarm configuration file and utilizing the function block.

The alarm configuration GUI can be interacted with via one or more client devices (e.g., a personal computer, a laptop, a smart phone). The interaction can be via an application of a client device, such as a dedicated application (e.g., dedicated to alarm configuration) or a general application capable of rendering the alarm configuration GUI (e.g., a browser application when the alarm configuration GUI is implemented via HTML and/or XML). A client device that interacts with the alarm configuration GUI can be at least selectively in communication with the process automation network and interaction with the alarm configuration GUI, via the client device, can cause reading and/or writing of entries to an alarms database, described herein, that is coupled to the process automation network. Further, the alarms database can be used, as described herein, in deploying process automation alarms to various DCNs of the process automation system. Accordingly, the alarm configuration GUI enables a user to specify a function block identifier for an alarm and condition(s) for the alarm, and to cause generation of a corresponding alarm configuration file and deployment of the alarm configuration file to a corresponding DCN that utilizes the function block, identified by the function block identifier, in alarm monitoring. Notably, this can be done without requiring a direct (e.g., wired) connection between the corresponding DCN and an HMI and can be done without the user ever needing to ascertain a location and/or other characteristic(s) of the corresponding DCN that utilizes the function block. In these and other manners, utilization of the alarm configuration GUI enables alarms to be efficiently generated and deployed across multiple DCNs of an automation system.

Through interaction with the alarm configuration GUI, a user can create new alarms for function blocks, can view existing alarms for function blocks, and/or can modify existing alarms for function blocks (e.g., supplant an existing alarm with a new alarm). In various implementations, the alarm configuration GUI requires successful authentication before enabling a user to at least create new alarm(s) and/or modify existing alarm(s). Various single or multi-factor authentication techniques can be utilized such as username and password authentication, biometric authentication (e.g., fingerprint, voice, face), and/or location-based authentication (e.g., requiring the client device to be connected to the process automation network).

The alarm configuration GUI can utilize various techniques in guiding an interacting user to efficiently create a new alarm and/or modify an existing alarm. For example, the alarm configuration GUI can efficiently guide a user to a function block by enabling searching of function block identifiers via the GUI, enabling browsing of all function block identifiers via the GUI, and/or enabling searching or browsing of a subset of function block identifiers via the GUI. A subset of function block identifiers can be, for example, an unconfigured subset or a recent changes subset. An unconfigured subset can include function block identifier(s) for function block(s) that lack any (or certain) alarm(s) and/or that contain inactive alarm(s). A recent changes subset can include function block identifier(s) for function block(s) with recent update(s) to their alarm(s), where recency can be pre-defined or can be definable through interaction with the alarm configuration GUI.

As another example, when a function block identifier is selected through interaction with the alarm configuration GUI, the alarm configuration GUI can efficiently guide a user in specifying condition(s) and/or other parameter(s) for alarm(s) for a function block that corresponds to the function block identifier. For instance, a type of the function block can be used to select alarm type(s), that are compatible with the type of the function block, and only those alarm type(s) presented in the alarm configuration GUI for specification. As a particular instance, "PV" in "FT101.PV" can indicate the function block is of a "process variable" type. As a result of selecting "FT101.PV" and "PV" indicating the "process variable" type, only alarm types compatible with a "process variable" type of function block can be presented in the alarm configuration GUI for specification (e.g., only Error, Level, Rate of Change, and Deviation alarm types). As another particular instance, "DOUT" in "AB303.DOUT" can indicate the function block is of a "digital output" type. As a result of selecting "AB303.DOUT" and "DOUT" indicating the "digital output" type, only alarm types compatible with a "digital output" type of function block can be presented in the alarm configuration GUI for specification (e.g., only Error and Discrete State alarm types).

Also, for instance, process variable(s) of the function block can be identified and presented in the alarm configuration GUI to enable efficient specification of the process variable(s) to which condition(s) of an alarm are directed. As yet another instance, entry graphical interface element(s) can be presented in the alarm configuration GUI to enable efficient specification of condition(s) that pertain to a selected alarm type. The entry graphical interface element(s) can include, for example, free-form input field(s) (that can optionally be restricted to range(s) of value(s)), drop-down selection interfaces, and/or other entry graphical interface element(s). As yet a further instance, existing alarm(s), that are already specified via alarm configuration file(s) in an alarms database, can be presented in the alarm configuration GUI to enable efficient review of the existing alarm(s) and, further, efficient modification of the existing alarm(s) (thereby creating new alarm(s) to replace the existing alarm(s)).

After condition(s) and/or other parameter(s) of an alarm are specified via the alarm configuration GUI, a corresponding alarm configuration file can be generated. For example, the alarm configuration file can be generated responsive to an interacting user selecting a confirmatory interface element, in the alarm configuration GUI, after specifying parameter(s) of the alarm. The alarm configuration file can also be stored, in an alarms database, in association with a corresponding function block identifier of a function block and, optionally if known, in association with a corresponding DCN that utilizes the function block in alarm monitoring. As described herein, storing the alarm configuration file in association with the corresponding function block identifier can achieve various technical benefits.

A generated alarm configuration file can also be transmitted, via the process automation network, to a given DCN that utilizes the function block (corresponding to the alarm configuration file) in alarm monitoring. Transmitting the generated alarm configuration file to the given DCN causes the given DCN to implement local alarm monitoring based on the alarm configuration file and the function block. In some implementations or situations, a network addressable DCN identifier of the given DCN may be known at the time of generation of the alarm configuration file. For example, the given DCN may have previously sent a transmission that includes the network addressable DCN identifier and includes an indication that the DCN performs alarm monitoring based on the function block (e.g., includes the function block identifier of the function block). In some versions of those implementations or situations, the alarm configuration file can be proactively and unilaterally "pushed" to the given DCN through a transmission addressed to the network addressable DCN identifier of the given DCN. In some other versions of those implementations or situations, an update request can be unilaterally pushed to the given DCN through a transmission addressed to the network addressable DCN identifier. The update request lacks the actual alarm configuration file, but indicates to the given DCN that an updated alarm configuration file is available. The given DCN can thereafter request the alarm configuration file when it deems appropriate (e.g., when alarm configuration condition(s) described herein are satisfied). For example, the given DCN can later transmit an alarm configuration request described herein, and can receive the alarm configuration file in response.

In some other implementations or situations, a network addressable DCN identifier of the given DCN is not known (e.g., not stored in an alarms database in association with the function block identifier) at the time of generation of the alarm configuration file. For example, the given DCN may not yet be commissioned at that time of generation of the alarm configuration file, or which DCN will implement alarm monitoring based on the function block may not have even been determined at the time of generation of the alarm configuration file. In some versions of those implementations, the alarm configuration file will not be provided to the given DCN until an alarm configuration request is transmitted by the given DCN. As described herein, the alarm configuration request can include the function block identifier, enabling identification of the alarm configuration file (based on its stored association, in the alarms database, with the function block identifier) and its transmission to the given DCN in response to the alarm configuration request.

As referenced in the preceding paragraph, implementations enable a process automation node, such as a DCN, to transmit, via a process automation network, an alarm configuration request that includes function block identifier(s). The DCN can include the function block identifier(s) in the alarm configuration request based on the corresponding function block(s) being executed by the DCN and/or being assigned for use in alarm monitoring by the DCN. For example, the DCN can include a function block identifier in the alarm configuration request in response to the corresponding function block being executed by the DCN. As another example, the DCN can include the function block identifier in the alarm configuration request in response to the corresponding function block being monitored by an alarm engine of the DCN (e.g., an alarm engine executed by a server implemented by the DCN). A function block, monitored by an alarm engine of a DCN, can be one that is also executed by the DCN or it can be one that is executed by an additional DCN, but nonetheless monitored by the DCN via communications between the DCN and the additional DCN. The communications between the DCN and the additional DCN can be via the process automation network and/or via another channel.

An alarm configuration service can be implemented on one or more server(s) coupled to the process automation network, and can manage the alarms database along with and/or in cooperation with an alarm configuration GUI system that implements the alarm configuration GUI. The alarm configuration service can transmit alarm configuration files to appropriate DCNs according to techniques described herein. For example, the alarm configuration service can receive an alarm configuration request from a DCN and search the alarms database, using the function block identifier(s) of the request, to retrieve alarm configuration file(s) that are assigned to the function block identifier(s) in the alarms database. The alarm configuration service can transmit, in response to the alarm configuration request, the retrieved alarm configuration file(s) to the DCN for implementation thereof by an alarm engine of the DCN. In these and other manners, a newly commissioned DCN (e.g., commissioned upon initial commissioning of the process automation system or commissioned to replace a removed DCN) can obtain appropriate alarm configuration file(s) to implement utilizing only function block identifier(s) of function block(s) that are utilized by (e.g., executed by and/or assigned for use in alarm monitoring by) the newly commissioned DCN. Further, the alarm configuration service can optionally retrieve and provide the alarm configuration file(s) without any reference to a DCN identifier of the particular DCN on which the given function block will be implemented. Additionally or alternatively, a DCN with update(s) (e.g., removals or additions) to its utilized function block(s) can obtain appropriate alarm configuration files to implement utilizing only function block identifier(s) of function block(s) implemented by the DCN.

Utilization of assignment of the alarms to function block identifiers, in deploying alarms according to implementations disclosed herein, can enable alarm deployment that is robust in the distributed and/or heterogeneous process automation system setting and/or that mitigates errors in such a setting. For example, utilization of function block identifiers, in lieu of or in addition to DCN identifiers, in determining which alarm configuration file(s) to provide in response to an alarm configuration request, can mitigate issues that might otherwise arise with old DCNs being replaced with new DCNs (with new DCN identifiers), alarm engine monitoring functionality being switched from a given DCN (with a given DCN identifier) to alternate DCN(s) (with alternate DCN identifier(s)), etc.

In various implementations, an alarm configuration request can be issued by a DCN responsive to the DCN detecting occurrence of one or more alarm configuration conditions. For example, an alarm configuration request can be issued by a DCN responsive to the DCN determining it is newly commissioned (e.g., newly added to the process automation system), determining it has been powered up (e.g., initially or after a restart), determining that its alarm engine is assigned to monitor function block(s) but that monitoring not being currently active (e.g., due to lacking any alarm configuration file(s) for the function block(s)), determining that is has been more than a threshold duration of time since it last issued an alarm configuration request, receiving an update request from the alarm configuration service, and/or detecting occurrence of other condition(s). Causing a DCN to issue the alarm configuration request in response to detecting such certain condition(s) can ensure that the DCN proactively seeks alarm configuration file(s) in situation(s) where they are likely needed. Additionally or alternatively, by preventing issuance of an alarm configuration request by the DCN when the certain condition(s) are not detected, resources of the process automation system can be conserved. For example, network resources can be conserved such as those utilized in transmitting the alarm configuration request from the DCN to the alarm configuration service and/or those utilized by the alarm configuration service in responding to the alarm configuration request.

In some implementations, the alarm configuration request issued by the DCN (or a separate transmission, from the DCN, provided in conjunction with the alarm configuration request) can also include a DCN identifier (e.g., an IP address and/or a MAC address) of the particular DCN. In some of those implementations, the alarm configuration service can, based on the alarm configuration request including the function block identifier and the DCN identifier, update the alarms database to assign the DCN identifier to the alarm configuration file (returned responsive to the alarm configuration request) and/or to the function block identifier (included in the alarm configuration request).

The DCN identifier assigned in the alarms database can thereafter be used for one or more purposes. Such purpose(s) can include utilization of the DCN identifier to establish a connection-oriented communication session with the DCN. For example, the DCN identifier can be used to establish a Transmission Control Protocol (TCP) communication session between the DCN and an alarm viewer engine via which an alarm engine of the DCN can provide, to the alarm viewer engine, indication(s) related to active and, optionally inactive alarm(s). Such purpose(s) can additionally or alternatively include utilization of the DCN identifier to push new alarm configuration files to the particular DCN. For example, if a new alarm configuration file is generated for the function block identifier using the alarm configuration GUI, a notification can be transmitted to the particular DCN using the DCN identifier, and can be transmitted using the DCN identifier based on it being assigned to the function block identifier. The notification can cause the particular DCN to then issue an alarm configuration request with corresponding function block identifier(s), resulting in the particular DCN receiving the updated alarm configuration file. As another example, if a new alarm configuration file is generated for the function block identifier using the alarm configuration GUI, the alarm configuration file can be proactively and unilaterally pushed to the particular DCN using the DCN identifier, and can be pushed using the DCN identifier based on it being assigned to the function block identifier.

A new DCN identifier can be assigned, to the alarm configuration file and/or the function block identifier and in the alarms database, in response to a later alarm configuration request (or other transmission) that includes the function block identifier and the new DCN identifier. For example, assume the particular DCN is replaced with a replacement DCN having a new DCN identifier. In response to the replacement DCN transmitting the alarm configuration request, the alarm configuration service can supplant, in the database, the assignment(s) of the DCN identifier with assignment(s) of the new DCN identifier to the alarm configuration file and/or to the function block identifier.

Accordingly, implementations disclosed herein enable effective deployment of alarm configuration files to appropriate process automation nodes as those process automation nodes are brought online in a newly commissioned process automation system. Further, implementations additionally or alternatively enable robust adaptation to replacement and/or modification of process automation nodes and/or other system component(s) in an active process automation system. For example, implementations enable robust alarm adaptation when a function block is removed from execution and/or alarm monitoring at a first DCN and redeployed for execution and/or alarm monitoring at a second DCN. Also, for example, implementations enable robust alarm adaptation when a first DCN executing and/or monitoring first function blocks is replaced by a second DCN (e.g., with different hardware specification(s)) also executing and/or monitoring the first function blocks.

The above description is provided as an overview of some implementations of the present disclosure. Further description of those implementations, and other implementations, are described in more detail below.

In addition, some implementations include one or more processors of one or more devices, where the one or more processors are operable to execute instructions stored in associated memory, and where the instructions are configured to cause performance of any of the aforementioned methods. The processor(s) can include various hardware processors such as central processing unit(s) (CPU(s)), application-specific integrated circuit(s) (ASIC(s)), field-programmable gate array(s) (FPGA(s)), graphics processing unit(s) (GPU(s)), digital signal processor(s) (DSP(s)), and/or other processor(s). Some implementations additionally or alternatively include one or more transitory or non-transitory computer readable storage media storing computer instructions executable by one or more processors to perform any of the methods disclosed herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5A, FIG. 5B, FIG. 5C, and FIG. 5D illustrate another example progression, of an alarm configuration GUI as a user interacts with the alarm configuration GUI, to cause generation of a new alarm configuration file to replace an existing alarm configuration file associated with a function block identifier.

DETAILED DESCRIPTION

Implementations disclosed herein relate to ensuring robust and/or accurate alarm monitoring based on function blocks implemented by DCNs of a process automation system. At least a subset of such function blocks are each utilized in implementing at least part of a corresponding at least partially automated process. As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes can be sub-processes of an overall process automation system workflow, such as a single process loop mentioned previously. Other at least partially automated processes can include all or a significant portion of an entire process automation system workflow. In some cases, the degree to which a process is automated can exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, and/or other domain(s).

Figure 1:
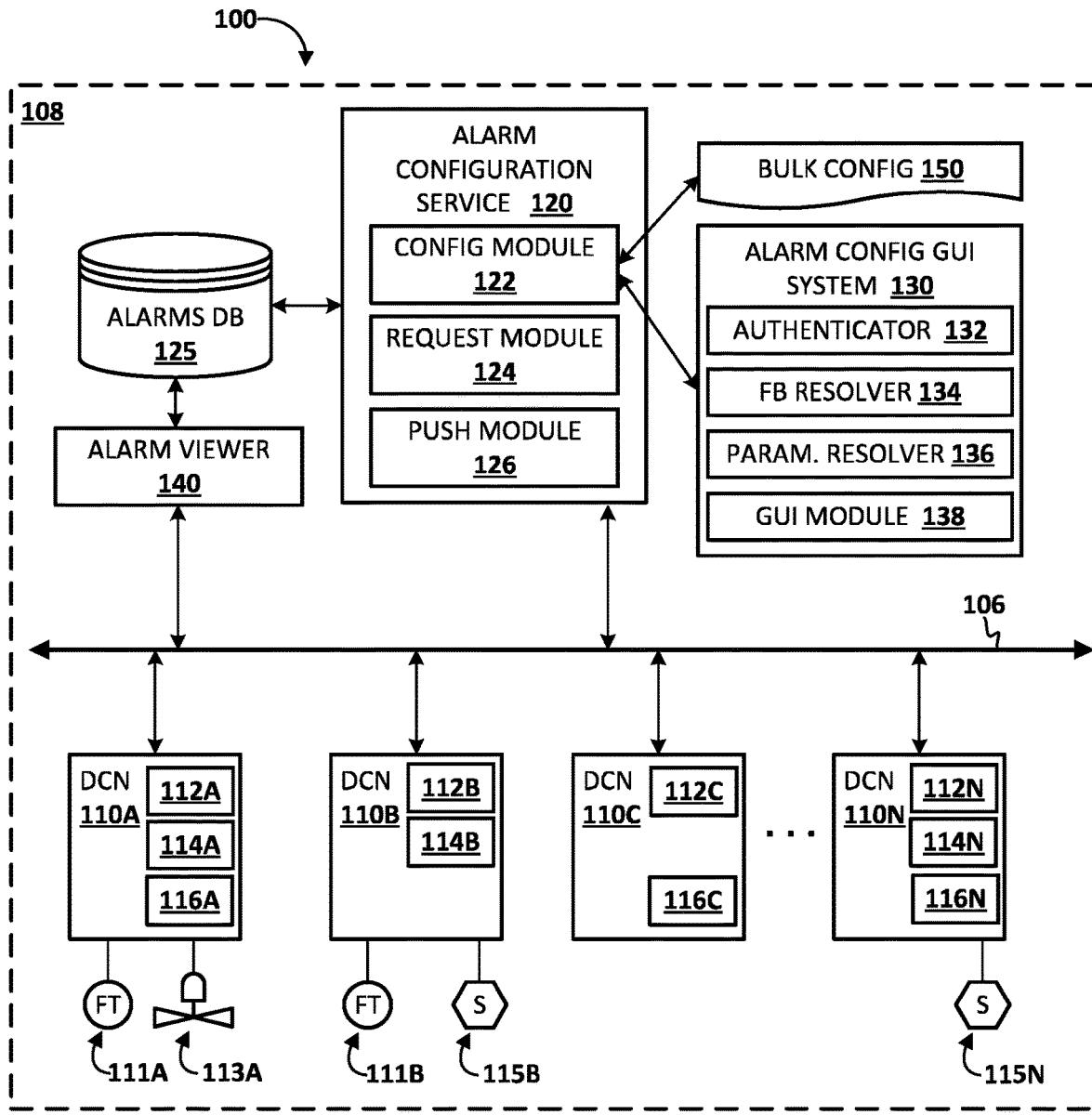
FIG. 1 illustrates an example environment in which selected aspects of the present disclosure can be implemented, in accordance with various implementations.

Referring now to FIG. 1, an example environment 100 in which various aspects of the present disclosure can be implemented is depicted schematically. Environment 100 includes a process automation system 108 that can be implemented in various industrial settings, such as part of a chemical processing plant, an oil or natural gas refinery, a catalyst factory, a manufacturing facility, or other industrial setting(s). Process automation system 108 is illustrated in FIG. 1 as including an alarm configuration service 120, an alarms database 125, an alarm configuration graphical user interface (GUI) system 130, an alarm viewer 140, a process automation network 106, and distributed control nodes (DCNs) 110A-110N. The process automation system 108 can include various additional components. However, those are not illustrated in FIG. 1 for the sake of simplicity.

Process automation network 106 can be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 can be configured with redundancies and/or backups to provide high availability (HA) and/or high quality of service (QOS). Additionally, nodes that exchange data over process automation network 106 can implement time-sensitive networking (TSN) to facilitate time synchronization and/or real-time control streams. Various nodes/devices are operably coupled with process automation network 106, such as alarm configuration service 120, alarm viewer 140, alarm configuration GUI system (optionally via alarm configuration service 120), and DCNs 110A-N.

DCNs 110A, 110B, 110C, and 110N are illustrated in FIG. 1. However, it is noted that additional (e.g., hundreds of or even thousands of) DCN(s) can be provided in process automation system 108, as indicated by the ellipsis between DCN 110C and DCN 110N. Some DCNs in process automation system 108 can have input(s)/output(s) (I/O(s)) for coupling with sensor(s), human machine interface(s) (HMI(s)), actuator(s), and/or other components. Other DCN(s) in process automation system 108 can optionally omit I/O(s).

DCN 110A is coupled, via a first I/O, to a flow transmitter (FT) component 111A and, via a second I/O to an actuator (e.g., a valve) 113A. The actuator 113A, and other actuators described herein, can be an electric, hydraulic, mechanical, and/or pneumatic component that is controllable to affect some aspect of a process automation workflow that occurs at process automation facility 108. The FT component 111A includes sensor(s) that provide sensor data indicating flow rate of a corresponding fluid flow and also includes actuator(s) that can be adjusted to control the corresponding fluid flow. Sensors described herein can take various forms, including but not limited to a pressure sensor, a temperature sensor, a flow sensor, various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and/or other form(s).

DCN 110A includes processor(s) 112A that can utilize associated memory (and corresponding instructions stored therein) for implementing corresponding function(s) of the DCN 110A. Those function(s) include implementing function block(s) 114A of DCN 110A, which can be stored in some of the associated memory. Those function(s) also include implementing an alarm engine 116A.

Each of the function block(s) 114A of DCN 110A can define one or more aspects of sensor monitoring and/or actuator control that is performed by DCN 110A. In some implementations, each of the function block(s) 114A is a corresponding software model that contains input/output variable(s), through variable(s), internal variable(s), and/or an internal behavior description of the function(s) to be performed by the function block. As a non-limiting example, one of the function block(s) 114A of DCN 110A can control an actuator of FT component 111A based on sensor data from sensor(s) of FT component 111A. As another non-limiting example, another of the function block(s) 114A of DCN 110A can control the actuator 113A in dependence on output(s) from other function block(s), such as other function block(s) implemented at DCN 110A and/or at other DCN(s) 110B-N.

The alarm engine 116A can optionally be implemented utilizing open standard protocol(s). For example, the alarm engine 116A can be implemented by an Open Platform Communications (OPC) Unified Architecture (OPC-UA) server that is executed on the DCN 110A by processor(s) 112A thereof. The alarm engine 116A can utilize alarm configuration file(s), described herein, in monitoring for occurrence of alarm condition(s) dictated by an alarm configuration file and performing corresponding action(s) if the alarm condition(s) are detected. The corresponding action(s) can also optionally be dictated by the alarm configuration file. The condition(s) defined by an alarm configuration file can include, or be restricted to, those that reference process variable(s) of function block(s), such as input variable(s), output variable(s), through variable(s), and/or internal variable(s) of function block(s). The action(s) performed in response to an alarm condition being detected can include, for example, sending corresponding data to alarm viewer 140 to cause rendering, at one or more output interface(s), of a corresponding audible and/or visual alarm. The sending of the corresponding data can be via a connection-oriented communication session, between the alarm engine 116A and the alarm viewer 140, as described herein. The action(s) performed in response to an alarm condition being detected can additionally or alternatively include causing remediation(s) to be performed. For example, halting and/or altering function block(s) responsible for the alarm condition and/or related function block(s).

As one example, alarm engine 116A can monitor for condition(s) that reference process variable(s) of a function block, of function block(s) 114A, that relate to the FT component 111A. For instance, the condition(s) can define a high-high, high, low, and/or low-low limit(s) for a measured flow variable (based on a sensor of the FT component 111A) of the function block. Also, for instance, the condition(s) can define a maximum rate of change of the measured flow variable. As yet another instance, the condition(s) can define a maximum deviation between the measured flow variable and a setpoint for the flow variable. As another example, alarm engine 116A can additionally or alternatively monitor for condition(s) that reference other process variable(s) of an additional function block, of function block(s) 114A, that relate to the actuator component 113A. For instance, the condition(s) can define state(s) of the actuator component 113A as determined based on input(s) to the additional function block.

As described herein, the DCN 110A can obtain the alarm configuration file(s), that define the alarm(s) to be monitored by the alarm engine 116A, from the alarm configuration service 120 and via the process automation network 106. The alarm configuration file(s) can optionally include alarm configuration file(s) generated through interactions with alarm configuration GUI system 130 described herein. As one example, the DCN 110A can transmit, via the process automation network 106 and to the alarm configuration service 120, an alarm configuration request. The DCN 110A can include, in the alarm configuration request, function block identifier(s) of the function block(s) 114A, and can include them based on them being function block(s) 114A that are executed by the DCN 110A and/or based on them being function blocks for which alarm monitoring is to be performed by alarm engine 116A (when corresponding alarm configuration files are obtained). The DCN 110A can transmit the alarm configuration request in response to detecting occurrence of an alarm configuration condition, such as one or one or more alarm configuration conditions described herein. As another example, alarm configuration file(s) can be obtained by the DCN 110A as a result of being proactively and unilaterally pushed to the DCN 110A by the alarm configuration service 120.

DCN 110B is coupled, via a first I/O, to a flow transmitter (FT) component 111B and, via a second I/O to a sensor 115B. DCN 110B includes processor(s) 112B that can utilize associated memory (and corresponding instructions stored therein) for implementing corresponding function(s) of the DCN 110B. Those function(s) include implementing function block(s) 114B of DCN 110B, which can be stored in some of the associated memory. Notably, DCN 110B does not include any corresponding alarm engine and, thus, the function(s) implemented by processor(s) 112B do not include implementing any alarm engine. Rather, alarm monitoring pertinent to function block(s) 114B, of DCN 110A, is performed by DCN 110C (described below).

Each of the function block(s) 114B of DCN 110B can define one or more aspects of sensor monitoring and/or actuator control that is performed by DCN 110B. In some implementations, each of the function block(s) 114B is a software model that contains input/output variable(s), through variable(s), internal variable(s), and/or an internal behavior description of the function(s) to be performed by the function block. As a non-limiting example, one of the function block(s) 114B of DCN 110B can control an actuator of FT component 111B based on sensor data from sensor(s) of FT component 111B, sensor data from sensor 115B, and/or sensor data from other sensor(s) (e.g., sensor of FT 111A).

DCN 110C is not coupled to any external component via any I/O and can optionally omit any I/O. Further, DCN 110C does not include any function blocks that it executes. Accordingly, DCN 110C does not implement any function blocks that directly or indirectly "control" any automated process of the process automation system 108. However, processor(s) 112C of DCN 110C do implement an alarm engine 116C that monitors function blocks of other DCN(s) of the process automation system. In some implementations, DCN 110C can be devoted exclusively to alarm monitoring.

Alarm engine 116C can optionally be implemented utilizing open standard protocol(s), such as by an OPC-UA server that is executed on the DCN 110C by processor(s) 112C thereof. The alarm engine 116C can utilize alarm configuration file(s), described herein, in monitoring for occurrence of alarm condition(s) dictated by an alarm configuration file and performing corresponding action(s) if the alarm condition(s) are detected. The condition(s) defined by an alarm configuration file can include, or be restricted to, those that reference process variable(s) of function block(s). The function block(s) to be monitored by alarm engine 116C include those that are not executed by DCN 110C (as DCN 110C does not execute any function blocks). For example, the alarm engine 116C can monitor function block(s) 114B of DCN 110B and/or function block(s) of other DCN(s). For instance, the monitoring of function block(s) 114B, during execution thereof, can be via communications, from DCN 110B, that reflect process variable(s) of the function block(s) 114B during their execution. Such communications can optionally be via a connection-oriented connection between DCN 110B and DCN 110C via e.g., process automation network 106. As one example, alarm engine 116C can monitor for condition(s) that reference process variable(s) of a function block, of function block(s) 114B, that relate to the sensor component 115B. For instance, the condition(s) can define a high-high, high, low, and/or low-low limit(s) for an internal variable, of the function block of function block(s) 114B, that is dependent on sensor data from the sensor 115B.

As described herein, the DCN 110C can obtain the alarm configuration file(s), that define the alarm(s) to be monitored by the alarm engine 116C, from the alarm configuration service 120 and via the process automation network 106. For example, the DCN 110C can transmit, via the process automation network 106 and to the alarm configuration service 120, an alarm configuration request. The DCN 110C can include, in the alarm configuration request, function block identifier(s) of the function block(s) 114B, and can include them based on them being function block(s) for which alarm monitoring is to be performed by alarm engine 116C (when corresponding alarm configuration files are obtained). The DCN 110C can transmit the alarm configuration request in response to detecting alarm configuration condition(s). As another example, alarm configuration file(s) can be obtained by the DCN 110C as a result of being proactively and unilaterally pushed to the DCN 110C by the alarm configuration service 120.

DCN 110N is coupled, via a first I/O, to a sensor 115N. DCN 110N includes processor(s) 112N that can utilize associated memory (and corresponding instructions stored therein) for implementing corresponding function(s) of the DCN 110N. Those function(s) include implementing function block(s) 114N of DCN 110N, which can be stored in some of the associated memory. Those function(s) also include implementing an alarm engine 116N. As described herein, the DCN 110N can obtain the alarm configuration file(s), that define the alarm(s) to be monitored by the alarm engine 116N, from the alarm configuration service 120 and via the process automation network 106.

The alarm configuration service 120 is illustrated as including a configuration module 122, a request module 124, and a push module 126. In some implementations, alarm configuration service 120 is implemented within a process automation facility, e.g., within a single building or across a single campus of buildings or other industrial infrastructure. In such an implementation, alarm configuration service 120 may be implemented on one or more local computing systems, such as on one or more server computers. However, in some implementations some or all aspects of alarm configuration service 120 can be implemented in computing system(s) that are remote from the process automation facility. In some of those implementations, the alarm configuration service 120 can be in communication with the process automation network 106 via a wide-area network.

The configuration module 122 can receive alarm configuration files, and assignments of those alarm configuration files to function block identifiers, and store those alarm configuration files and associated function block identifiers in alarms database 125. For example, a first alarm configuration file can be assigned to a first function block identifier of "FT101.PV", a second alarm configuration file can be assigned to a second function block identifier of "FT202.SP", etc. Further, the configuration module 120 can store, in the alarms database 125, the first alarm configuration file and an assignment (e.g., a pointer or other association) of the first alarm configuration file to the "FT101.PV" function block identifier, the second alarm configuration file and an assignment (e.g., a pointer or other association) of the first alarm configuration file to the "FT202.SP" function block identifier, etc.

The alarm configuration files and their associations can be generated based on user interface input(s) from engineer(s) and/or other human(s) implementing and/or maintaining the process automation system 108. In some implementations, some of the alarm configuration files and their associations are received via bulk configuration file(s) 150. The bulk configuration files 150 can be, for example, in .csv or other structured or unstructured format, and can be created utilizing one or more programs.

In some implementations, some or all of the alarm configuration files and their associations can be received via an alarm configuration graphical user interface (GUI) system 130. The alarm configuration GUI system 130 can be implemented via configuration module 122 or can be implemented via a separate component that is at least selectively in communication with the configuration module 122.

The alarm configuration GUI system 130 can be interacted with via (and optionally implemented in whole or in part by) one or more client devices (not illustrated in FIG. 1) that are each at least selectively in network communication with the process automation network 106. The interaction can be via an application of a client device and occurs via an alarm configuration GUI rendered by the alarm configuration GUI system 130. The alarm configuration GUI can include graphical interface elements for specifying a function block identifier and for specifying alarm configuration file parameter(s) for the function block identifier. For example, the alarm configuration GUI can include a field for specifying a function block identifier (e.g., from a drop-down menu, via free-form entry, via search or autocomplete based on entered character(s)) and can include field(s) for specifying function block variable(s) and condition(s) for those variable(s). For example, the alarm configuration GUI can enable specification of a function block identifier and, once the function block identifier is specified, can present function block variable(s) for the corresponding function block. Further, each of the function block variable(s) can be selectable and, if selected, corresponding condition(s) for the function block variable(s) can be defined through further interaction with the alarm configuration GUI. The selected function block variable(s) and the condition(s) can then be used to generate a corresponding alarm configuration file, and the corresponding alarm configuration file associated with the function block identifier. Updates to alarm configuration file(s) can be performed via further interaction with the alarm configuration GUI. For example, the alarm configuration GUI system 130 can enable viewing of, and modification (or even deletion of) existing alarm configuration files in the alarms database 125 (optionally while maintaining their association to function block identifiers and, optionally, to DCN identifiers).

Request module 124 receives and processes alarm configuration requests from DCNs, such as one or more of DCNs 110A-N, that are received via the process automation network 106. An alarm configuration request, received by request module 124, can include function block identifier(s) of function block(s) and, optionally, a DCN identifier of the DCN that transmitted the alarm configuration request. In response to receiving the alarm configuration request, the request module 124 can access alarms database 125 and identify, in the alarms database, function block identifier(s) that match those of the alarm configuration request. Further, the request module 124 can identify the alarm configuration file(s) that are stored in association with the matching function block identifier(s). Yet further, the request module 124 can transmit, via the process automation network and in response to the alarm configuration request and to the DCN that issued the alarm configuration request, the identified alarm configuration file(s). Optionally, the request module 124 can update the alarms database 125 to store an association of the DCN identifier, optionally included with the alarm configuration request, to the identified function block identifier(s) and/or to the identified alarm configuration file(s). In doing so, the request module 124 can remove any stored association(s) of a disparate DCN identifier to the identified function block identifier(s) and/or the identified alarm configuration file(s). As described herein, the alarm viewer 140 and/or the push module 126 can utilize the stored association of the DCN identifier to the identified function block identifier(s) and/or to the identified alarm configuration file(s).

Push module 126 is optional and, when provided can be used to cause new alarm configuration file(s) to be provided to corresponding DCN(s). For example, in response to an update of an alarm configuration file via alarm configuration GUI system 130, configuration module 122 can store, in alarms database 125, the new alarm configuration file in association with its function block identifier, while maintaining any association of the function block identifier to a DCN identifier and/or while creating an association of the new alarm configuration file to the DCN identifier. As described with respect to request module 124, the request module 124 can store, in alarms database 125 association(s) of a DCN identifier to function block identifier(s) and/or alarm configuration file(s) in response to an alarm configuration request, from a corresponding DCN, that includes the function block identifier(s). The push module 126 can identify a new alarm configuration file in response to a notification from configuration module 122 or in response to recognizing an update in the alarms database 125. In response to identifying a new alarm configuration file, the push module 126 can cause the updated alarm configuration file to be provided to the DCN that corresponds to the DCN identifier associated with the updated alarm configuration file and/or its associated function block identifiers.

In some implementations, in causing a new alarm configuration file to be provided to the DCN that corresponds to the DCN identifier, the push module 126 can proactively and unilaterally transmit the updated alarm configuration file to the DCN identifier and independent of any alarm configuration request from the DCN. In some implementations, in causing an updated alarm configuration file to be provided to the DCN that corresponds to the DCN identifier, the push module 126 can transmit, to the DCN identifier, an update request that when received by the DCN, can be determined to be an alarm configuration condition. The DCN can thereafter, when deemed appropriate by the DCN, transmit an alarm configuration request. The alarm configuration request can be processed by the request module 124, and the new alarm configuration file transmitted, by the request module 124 to the DCN, in response to the alarm configuration request. Implementations where the push module 126 provides the update request in lieu of the new alarm configuration file enables the DCN, receiving the update request, to determine when it is appropriate to transmit an alarm configuration request and receive the updated alarm configuration file in response. This can ensure the DCN is able to receive and/or process the new alarm configuration file when it is transmitted and/or can otherwise enable the DCN to manage its resource utilization. For example, the update request can be of a small data size (e.g., a byte or less)

and require very little processing when received, whereas the alarm configuration file can be of a larger size (e.g., more than one byte) and require more processing when received. Accordingly, the DCN can receive the update request and determine, locally, when to responsively transmit an alarm configuration request. For example, at a time of receiving the update request the DCN resources may be strained due to controlling of actuator(s) and/or an alarm engine of the DCN detecting current alarm condition(s) are satisfied. Based on one of both of these situations being present, the DCN can wait to issue the alarm configuration request when one or both of these situations is no longer present.

In situations where there is no DCN identifier associated with a new alarm configuration file, the push module 126 can optionally broadcast an update request via process automation network 106 and to multiple of the DCNs 110A-N of the process automation system 108. The update request, when received by each of the DCNs, can be determined to be an alarm configuration condition. Each DCN can thereafter transmit an alarm configuration request in response. In some implementations, a broadcasted update request can be differentiated from (e.g., comprise different data) an update request transmitted to a single DCN utilizing a DCN identifier. In some of those implementations, DCNs receiving the broadcasted update request can recognize it as such and transmit an alarm configuration request with timing that is based on it being broadcasted. For example, for a DCN broadcast request each DCN can randomly choose a corresponding time delay between 1 and 100 seconds and transmit the alarm configuration request with the randomly selected time delay. This can ensure non-concentrated distribution of transmission of alarm configuration requests, preventing overloading of resources of the process automation network 106 in and/or of the request module 124 in handling the alarm configuration requests.

Returning to the alarm configuration GUI system 130, it renders an alarm configuration GUI via which a user can interact to create new alarms for function blocks, to view existing alarms for function blocks, and/or to modify existing alarms for function blocks (e.g., supplant an existing alarm with a new alarm). The alarm configuration GUI system 130 is illustrated in FIG. 1 as including an authenticator 132, a function block resolver 134, a parameter(s) resolver 136, and a GUI module 138.

Authenticator 132 can utilize one or more authentication techniques in authenticating a user and can require successful authentication of the user prior to enabling the user to view alarms, create new alarm(s), and/or modify existing alarm(s) through utilization of the alarm configuration GUI system 130. For example, authenticator 132 can require successful authentication of a user, and verification that the authenticated user has "edit access", before enabling the user to create new alarm(s) and/or modify existing alarm(s). Authenticator 132 can utilize single or multi-factor authentication techniques in authenticating a user.

Function block resolver 134 can guide a user to a function block by enabling searching of all function block identifiers via the alarm configuration GUI, enabling browsing of all function block identifiers via the alarm configuration GUI, and/or enabling searching or browsing of a subset of function block identifiers via the alarm configuration GUI. For example, function block resolver 134 can, responsive to receiving typed or spoken input via the alarm configuration GUI, search for matching (partial or full) function block identifier(s). For instance, the alarms database 125 and/or other database of the process automation system can include all function block identifiers of the process automation system 108 and an association of each to their corresponding function block. The function block resolver 134 can compare character(s) of typed or spoken input to the function block identifiers in the database to identify one or more that match, and cause GUI module 138 to present the matching function block identifier(s). For instance, responsive to typed input of "FT101.PV", the function block resolver 134 can resolve a single matching function block identifier and cause GUI module 138 to present it. Also, for instance, responsive to typed input of "FT10", the function block resolver 134 can identify multiple matching function block identifiers, such as "FT101.PV" and "FT105.PV", and cause GUI module 138 to present each. Further, the function block resolver 134 can resolve a single one of those based on a selection of the single one of those when presented via the GUI module 138. In some implementations, function block resolver 134 can, responsive to receiving corresponding input via the alarm configuration GUI, restrict searching to a subset of function block identifiers. In some implementations, function block resolver 134 can, responsive to receiving corresponding input via the alarm configuration GUI, cause GUI module 138 to present all or a subset of function block identifiers, enabling user selection of one of the presented ones to resolve to a single function block identifier.

Parameter(s) resolver 136 can, when a function block identifier is resolved by function block resolver 134, guide a user in specifying condition(s) and/or other parameter(s) for alarm(s) for a function block that corresponds to the resolved function block identifier. For example, the parameter(s) resolver 136 can use a type of the function block to select alarm type(s), that are compatible with the type of the function block, and cause GUI module 138 to present only those alarm type(s) in the alarm configuration GUI for specification. For instance, "PV" in "FT101.PV" can indicate the function block is of a "process variable" type. As a result of selecting "FT101.PV" and "PV" indicating the "process variable" type, the parameter(s) resolver 136 can cause GUI module 138 to present only alarm types compatible with a "process variable" type of function block in the alarm configuration GUI for specification (e.g., only Error, Level, Rate of Change, and Deviation alarm types). Also, for example, the parameter(s) resolver 136 can cause GUI module 138 to present process variable(s) of the resolved function block in the alarm configuration GUI to enable efficient specification of the process variable(s) to which condition(s) of an alarm are directed. As yet another example, parameter(s) resolver 136 can cause GUI module 138 to present entry graphical interface element(s), in the alarm configuration GUI, to enable efficient specification of condition(s) that pertain to a selected alarm type. The entry graphical interface element(s) can include, for example, free-form input field(s), drop-down selection interfaces, and/or other entry graphical interface element(s). As yet another example, parameter(s) resolver 136 can cause GUI module 138 to present existing alarm(s), that are already specified via alarm configuration file(s) in an alarms database for the resolved function block identifier, to be presented in the alarm configuration GUI to enable efficient review of the existing alarm(s) and, further, efficient modification of the existing alarm(s).

GUI module 138 causes rendering of corresponding outputs in the alarm configuration GUI and processes inputs received via the alarm configuration GUI (e.g., typed input(s), selection(s) of graphical element(s), and/or spoken input(s)). As referenced above, the GUI module 138 can interact with the function block resolver 134 and/or the parameter(s) resolver 136 in updating the alarm configuration GUI during an interaction with a user in specifying an alarm.

After condition(s) and/or other parameter(s) of an alarm are specified via the alarm configuration GUI, a corresponding alarm configuration file can be generated. For example, the alarm configuration GUI system 130 can generate an alarm configuration file responsive to an interacting user selecting a confirmatory interface element, in the alarm configuration GUI, after specifying parameter(s) of the alarm. The alarm configuration GUI system 130 can also cause the alarm configuration file to be stored, in the alarms database 125, in association with a corresponding function block identifier of a function block and, optionally if known, in association with a corresponding DCN that utilizes the function block in alarm monitoring. For example, the alarm configuration GUI system 130 can provide the alarm configuration file and its associated function block identifier to configuration module 122, and configuration module 122 can store the alarm configuration file, in the alarms database 125, in association with the function block identifier.

Alarm viewer 140 can be in communication with alarm engine(s) of DCN(s) 110A-N and can cause rendering, of at least any active alarm(s), via one or more output device(s). For example, the alarm viewer 140 can cause display of at least active alarm(s) via fixed display screen(s) in a process automation facility. Also, for example, the alarm viewer 140 can cause at least some active alarm(s) (e.g., those designated as "high sensitivity" in corresponding alarm configuration file(s)) to be transmitted to mobile phone(s) of individual(s) e.g., as text message alerts or push notification(s) through an alarm application installed on the mobile phone(s). The rendering of an active alarm by alarm viewer 140 can optionally include audible and/or visual rendering of a descriptor that corresponds to the condition(s) that caused the alarm, such as a descriptor defined in the alarm configuration file for the alarm.

An active alarm can be signaled to the alarm viewer 140 based on a transmission from a DCN whose alarm engine determined occurrence of the active alarm. The transmission can include a descriptor of the alarm (e.g., as determined using an alarm configuration file), an identification of the function block and/or process variable(s) that resulted in the alarm, and/or an indication of the alarm configuration file. The alarm viewer 140, in rendering detail(s) on the alarm, can utilize information included in the transmission from the DCN and/or information that is derived, from the alarms database 125, utilizing information included in the transmission.

In various implementations, to ensure low-latency rendering of alarms by the alarm viewer 140 and/or security of alarm viewer 140, connection-oriented connections between the alarm viewer 140 and DCN(s) implementing alarm engine(s) can be desired. In some of those implementations, the alarm viewer 140 can utilize the DCN identifier(s), stored in alarms database 125 by request module 124 and in association with function block identifier(s) and/or alarm configuration file(s), in establishing such connection-oriented connections. This can ensure that connection-oriented connections are established between the alarm viewer 140 and corresponding DCN(s) and can overcome difficulties that arise with determining which DCN(s) implement alarm engine(s) in heterogeneous and/or distributed process automation systems.

FIG. 1 illustrates the example environment 100 at a first point in time, such as during initial commissioning of the process automation system 108. In some implementations, during initial commissioning, one or more of the DCNs 110A-N can initially include locally stored function block(s) (and corresponding function block identifier(s)) and/or locally stored alarm engine(s) (and corresponding function block identifier(s)), but may not have any alarm configuration file(s) stored thereon. After connecting to process automation network 106, such one or more of the DCNs 110A-N can each transmit a corresponding alarm configuration request and, in response, obtain any responsive alarm configuration file(s) from alarm configuration service 120. Those responsive alarm configuration file(s) can include, for example, some from bulk configuration files 150 and/or some defined via user interaction with alarm configuration system 130.

Figure 2:
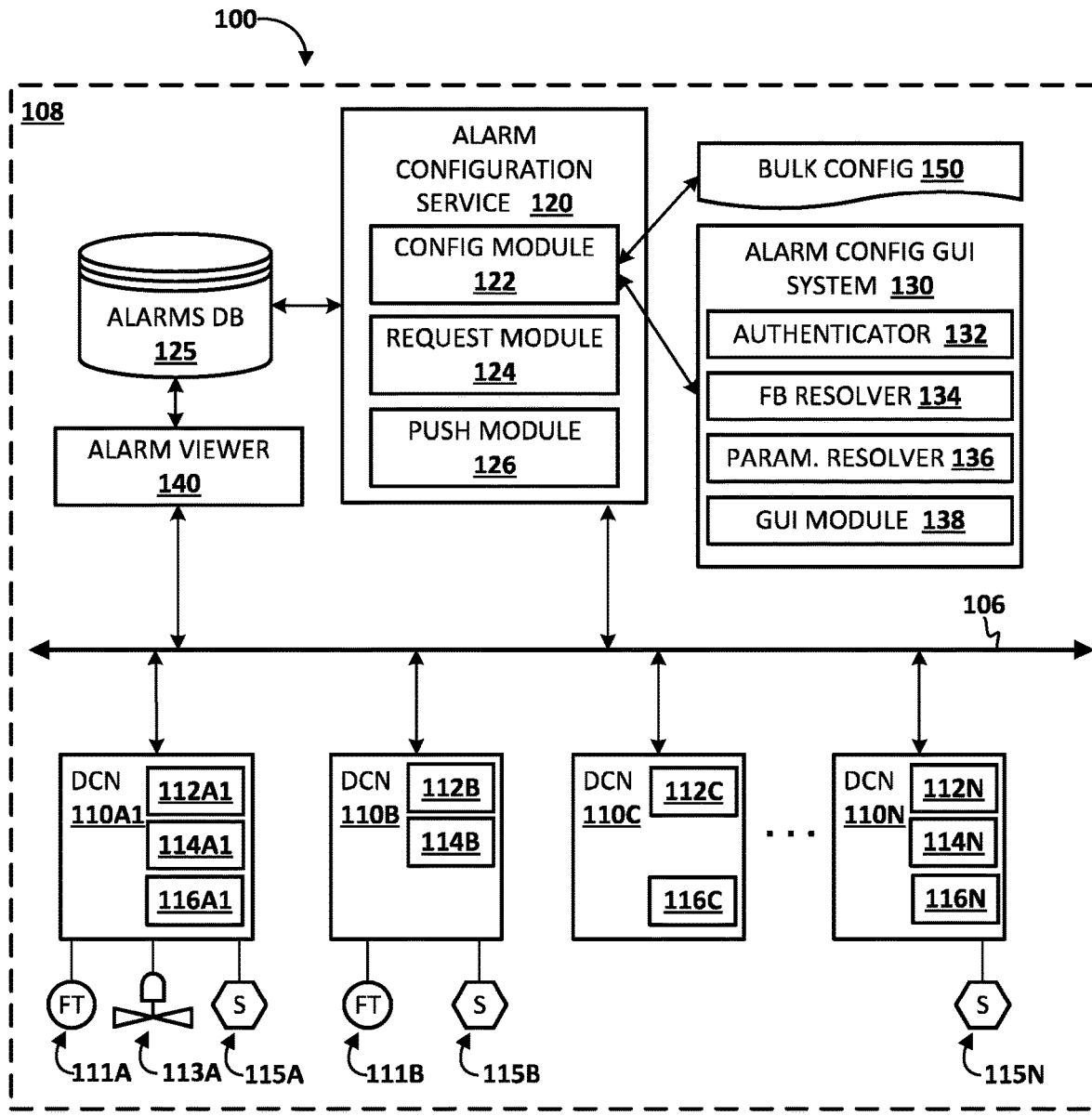
FIG. 2 illustrates the example environment of FIG. 1, after a first DCN of FIG. 1 has been replaced with an alternate DCN.

FIG. 2 illustrates the example environment 100 of FIG. 1, after the DCN 110A of FIG. 1 has been replaced with an alternate DCN 110A1. The alternate DCN 110A1 can replace DNC 110A due to, for example, failure of DCN 110A or the inability of the I/Os of DCN 110A to additionally connect sensor 115A (which is connected to 110A1 in FIG. 2). In FIG. 2, DCN 110A1 is coupled, via a first I/O, to the FT component 111A, is coupled, via a second I/O to the actuator 113A and is coupled, via a third I/O to the sensor 115A. DCN 110A1 includes processor(s) 112 A1 that can utilize associated memory (and corresponding instructions stored therein) for implementing corresponding function(s) of the DCN 110A1. Those function(s) include implementing function block(s) 114A1 of DCN 110A1, which can be stored in some of the associated memory. Those function(s) also include implementing an alarm engine 116A1. In response to commissioning or being powered on, the DCN 110A1 can transmit an alarm configuration request that includes function block identifiers of the function block(s) 114A1 and/or of the function block(s) that are monitored by the alarm engine 116A1, which can include additional function block(s) relative to function block(s) 114A (FIG. 1).

The request module 124 can, in response to the alarm configuration request, identify, from alarms database 125, the alarm configuration file(s) stored in association with the function block identifier(s) of the alarm configuration request. Further, the request module 124 can transmit, to the DCN 110A1, the identified alarm configuration file(s), to cause implementation of the alarm configuration file(s) by the DCN 110A1. Yet further, the request module 124 can optionally update the alarms database 125 to store an association of a DCN identifier, of DCN 110A1, with the alarm configuration file(s) and/or with the function block identifier(s). It is noted that the DCN identifier of DCN 110A1 can be unique relative to the DCN identifier of replaced DCN 110A. Accordingly, updating the alarms database 125 to reflect the DCN identifier of DCN 110A1 can enable alarm viewer 140 to establish a connection-oriented connection with DCN 110A1 and/or can enable effective pushing, of new alarm configuration file(s), by push module 126. Further, the unique DCN identifier of DCN 110A1 illustrates the robustness of including the function block identifier in the alarm configuration request, and/or the use thereof by request module 124 in responding to the request. For example, if some of the responsive alarm configuration files had instead been stored only in association with a DCN identifier of DCN 110A, and the DCN identifier of DCN 110A1 included in the request in lieu of the function block identifier(s), the request module 124 would be unable to identifier such alarm configuration file(s) in response to the alarm configuration request from DCN 110A1.

Figure 3:
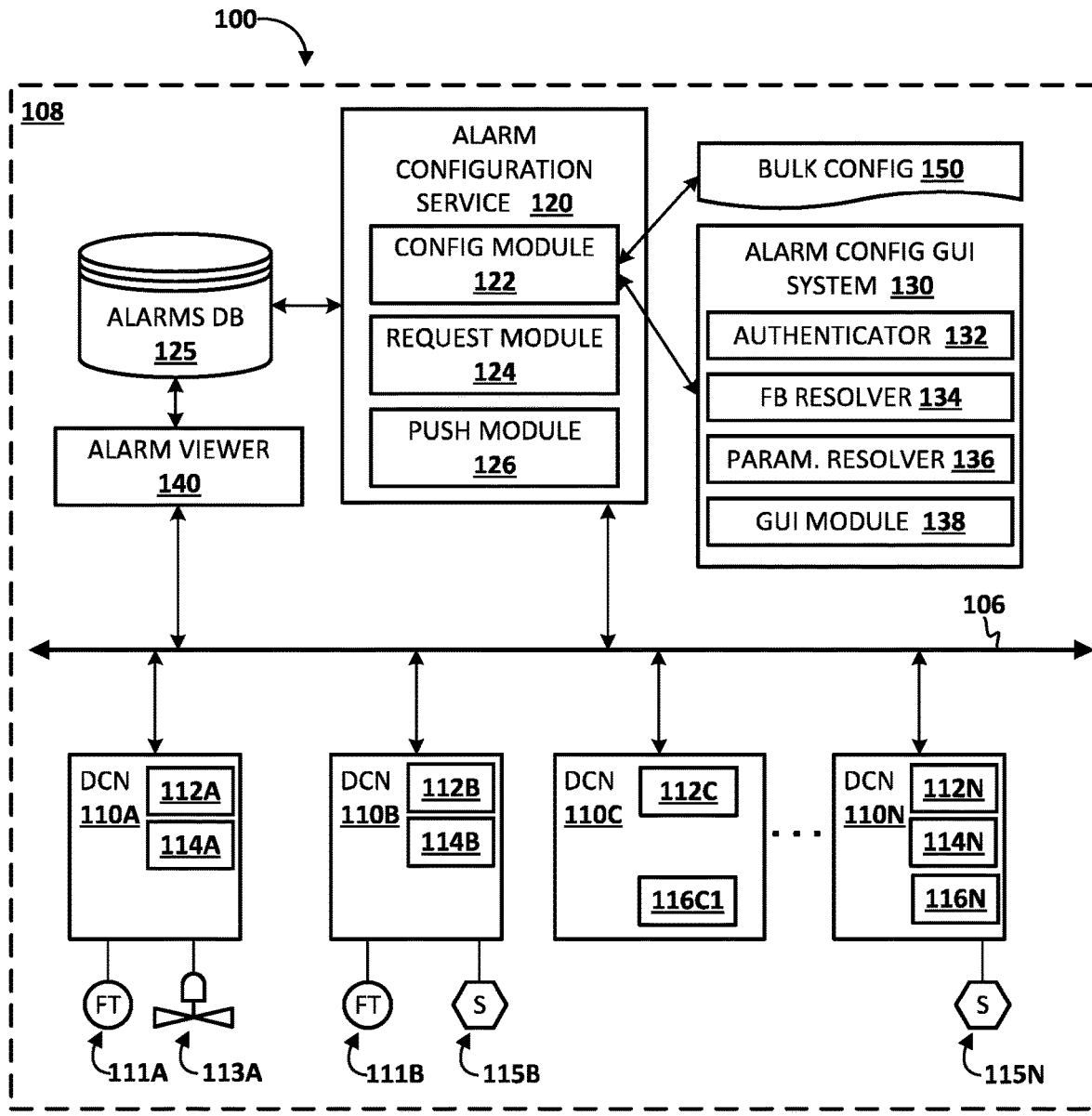
FIG. 3 illustrates the example environment of FIG. 1, after a first DCN of FIG. 1 has been altered to remove alarm monitoring functionality and the alarm monitoring functionality, removed from the first DCN, is implemented on a second DCN.

FIG. 3 illustrates the example environment 100 of FIG. 1, after DCN 110A of FIG. 1 has been altered to remove the alarm engine 116A. Further, the alarm engine 116C (FIG. 1) of DCN 110C has been altered so that it now also includes, in its alarm monitoring functionality, the alarm monitoring functionality that was implemented by the alarm engine 116A (removed from the first DCN 110A). In response to detecting an alarm configuration condition, DCN 110C can transmit an alarm configuration request that includes function block identifiers of the function blocks that are monitored by the alarm engine 116C1, which can include those that were previously monitored by alarm engine 116A (FIG. 1).

The request module 124 can, in response to the alarm configuration request, identify, from alarms database 125, the alarm configuration files stored in association with the function block identifiers of the alarm configuration request. Further, the request module 124 can transmit, to the DCN 110C, the identified alarm configuration files, to cause implementation of the alarm configuration files by the DCN 110C. Yet further, the request module 124 can optionally update the alarms database 125 to store an association of a DCN identifier, of DCN 110C, with the alarm configuration files and/or with the function block identifiers.

Referring now to FIGS. 4A-5D, some non-limiting examples are provided of interactions that can occur, between a user and an alarm configuration GUI, in causing generation of an alarm configuration file and its association with a function block identifier. For convenience, in describing aspects of FIGS. 4A-5D, some reference will be made to components of alarm system configuration GUI system 130 that can be utilized in the interactions.

Figure 4A:
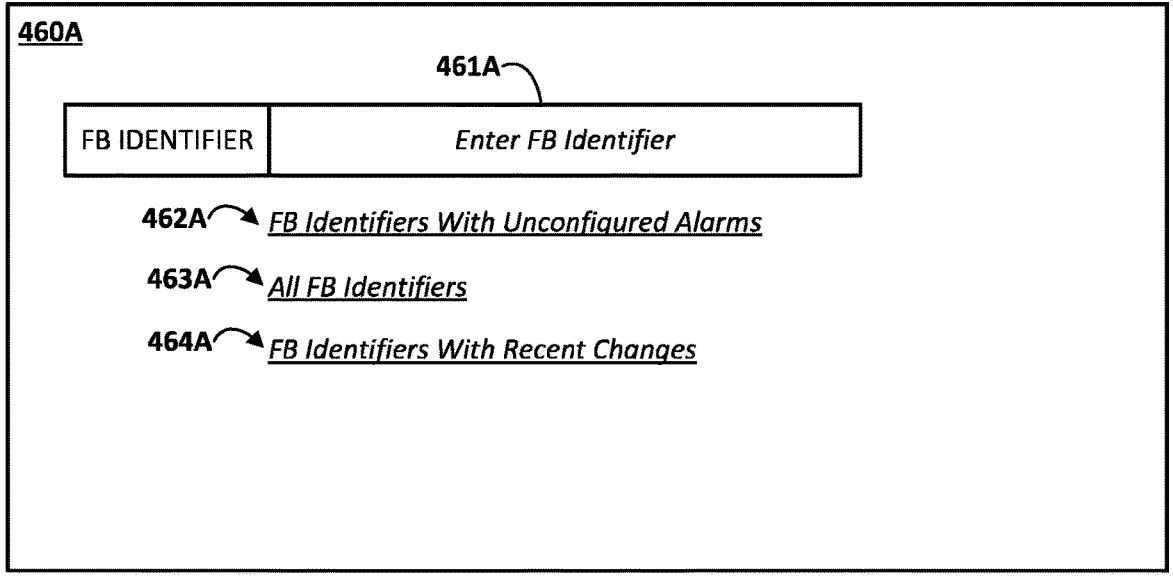
FIG. 4A, FIG. 4B, FIG. 4C, and FIG. 4D illustrate an example progression, of an alarm configuration GUI as a user interacts with the alarm configuration GUI, to cause generation of an alarm configuration file associated with a function block identifier.

In FIG. 4A, an example initial GUI 460A is illustrated that includes a function block search entry field 461A via which a user can enter (e.g., type) some or all of a function block identifier being sought. The function block resolver 134 can perform a search for matching function block identifier(s) based on entry of character(s) in the search entry field 461A. For example, the function block resolver 134 can perform live searches as the user types (e.g., updating search result(s) with each character typed) or can wait to perform a search until "enter" is selected, a threshold pause in typing is detected, or other completion indicator(s) are detected.

The initial GUI 460A also includes selectable options 462A, 463A, and 464A. Selection of selectable option 462A can cause presentation of only function block identifiers with unconfigured alarms and/or can cause the search (performed based on input at function block search entry field 461A) to be restricted to only function block identifiers with unconfigured alarms. Selection of selectable option 463A can cause presentation of all function block identifiers and/or can cause the search (performed based on input at function block search entry field 461A) to not be restricted to any subset of function block identifiers. Selection of selectable option 464A can cause presentation of only function block identifiers with recent changes to their alarms and/or can cause the search (performed based on input at function block search entry field 461A) to be restricted to only function block identifiers with recent changes. Optionally, selection of selectable option 464A causes presentation of an entry field via which a user can specify a criterion for recency (e.g., specify within the last 3 days, within the last week, etc.).

Figure 4B:
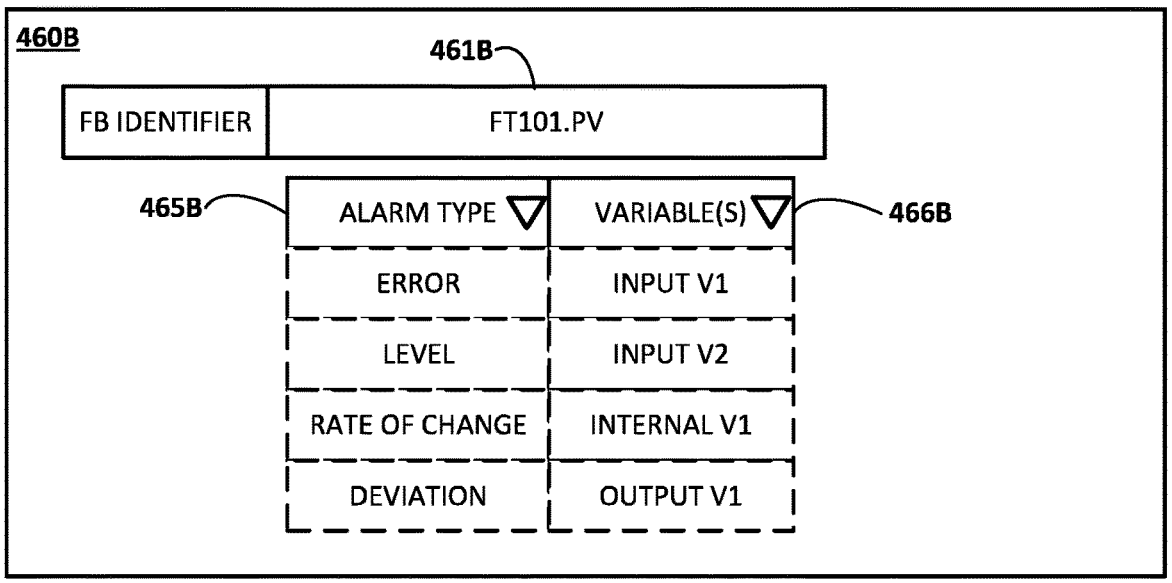

In FIG. 4B, a further GUI 460B is illustrated that includes a function block search entry field 461B that has been updated to reflect a resolved function block identifier of "FT101.PV". For example, "FT101.PV" can be resolved by the function block resolver 134 based on a search, for matching function block identifier(s), performed based on entry of character(s) in the search entry field 461A at the GUI 460A of FIG. 4A. For instance, the characters "FT10" could have been entered, resulting in a search being performed that included "FT101.PV", "FT105.PV", and "FT108.A1" as partially matching results. Further, each of those partially matching results could have been rendered by the GUI engine 138, and the "FT101.PV" result selected by the user, resulting in resolution of "FT101.PV" and transition to further GUI 460B of FIG. 4B.

The further GUI 460B also includes an alarm type selectable GUI element 465B and a variable(s) selectable GUI element 466B.

Selection of the alarm type selectable GUI element 465B can cause selectable options of "Error", "Level", "Rate of Change", and "Deviation" to be presented (e.g., in a drop-down menu as illustrated), any one of which can be selected to configure an alarm of a corresponding type. As described herein, parameter(s) resolver 136 can cause GUI engine 138 to display only those alarm types, when alarm type selectable GUI element 465B is selected, responsive to those alarm types being determined to be compatible with a "process variable" alarm type indicated by the ".PV" in "FT101.PV" (the resolved function block identifier).

Selection of variable(s) selectable GUI element 466B can cause selectable options of "Input V1", "Input V2", "Internal V1", and "Output V1" to be presented (e.g., in a drop-down menu as illustrated), one or more of which can be selected for utilization in configuring a corresponding alarm. As described herein, the presented selectable variables can be actual variables of the function block corresponding to "FT101.PV". Parameter(s) resolver 136 can cause GUI engine 138 to display those, when selectable GUI element 466B is selected, responsive to those being variables of the function block corresponding to "FT101.PV" (the resolved function block identifier).

Figure 4C:
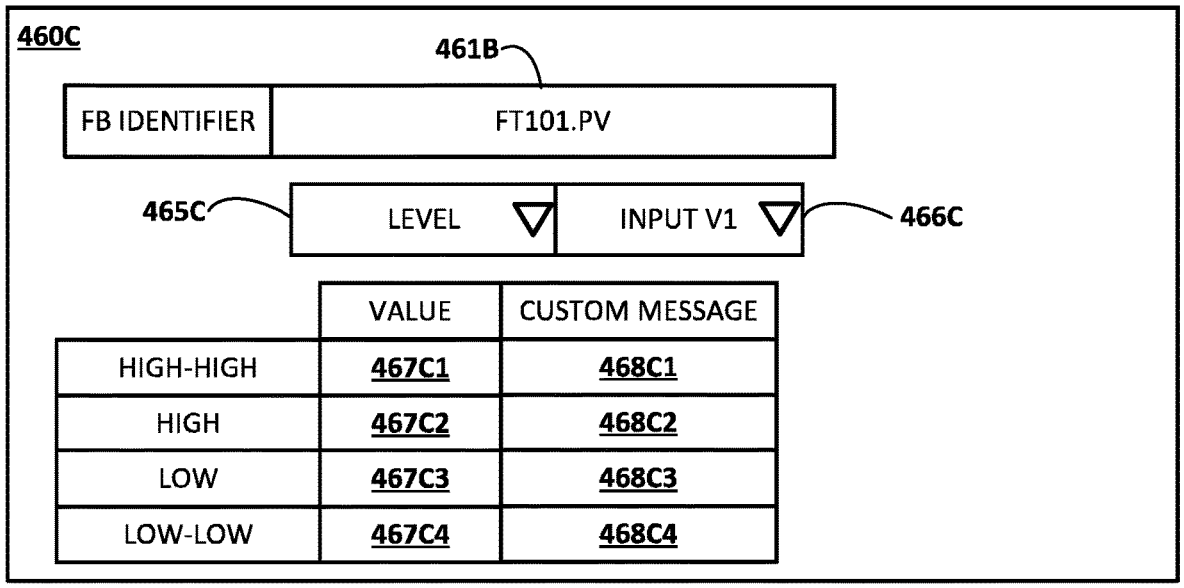

In FIG. 4C, a further GUI 460C is illustrated after the user interacted with alarm type selectable GUI element 465B in GUI 460B of FIG. 4B to select a "Level" alarm type 465C and interacted with variable(s) selectable GUI element 466B in GUI 460B of FIG. 4B to select an "Input V1" variable 466C.

The further GUI 460C also includes entry fields 467C1-4 that enable a user to input values to define respective of high-high, high, low, and low-low conditions for the "Level" alarm type 465C and for "Input V1". The further GUI 460C also includes entry fields 468C1-4 that enable a user to input values to define a respective custom message corresponding to occurrence of the high-high, high, low, and low-low conditions.

Figure 4D:
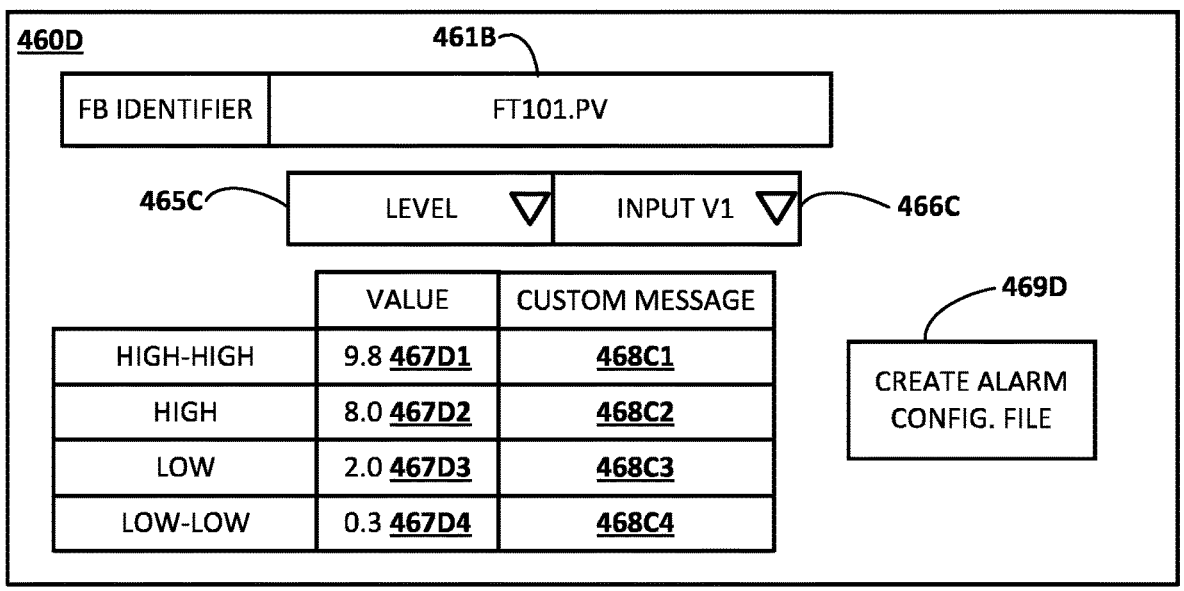

In FIG. 4D, a further GUI 460D is illustrated after the user interacted with entry fields 467C1-4 of FIG. 4C to enter a high-high value 467D1 of "9.8", to enter a high value 467D2 of "8.0", to enter a low value 467D3 of "2.0", and to enter a low-low value 467D4 of "0.3". Notably, the user elected not to interact with entry fields 468C1-4, leaving those blank.

In FIG. 4D, a confirmatory interface element 469D is also illustrated. Selection of the confirmatory interface element 469D can cause an alarm configuration file to be generated and stored in association with the "FT101.PV" function block identifier. For example, the generated alarm configuration file can specify "9.8" as a condition, of process variable "Input V1" that, if satisfied, causes a high-high notification to be provided. Also, for example, the alarm configuration file can specify "8.0" as a condition, of process variable "Input V1" that, if satisfied, causes a high notification to be provided. The alarm configuration file can similarly specify low and low-low conditions. Notably, as a result of entry fields 468C1-4 being blank, a respective default message can be utilized in the alarm configuration file for notifications in response to occurrence of the high-high, high, low, and low-low conditions. If the entry fields 468C1-4 had instead been filled-in based on user input, the respective filled-in messages could instead be utilized. For example, if 468C1 had been filled in with "Dangerous temp level at Tank 1", that message could be specified, in the alarm configuration file, as a notification to be provided in response to occurrence of the high-high condition.

Turning now to FIGS. 5A-D, another example progression is illustrated, of an alarm configuration GUI, as a user interacts with the alarm configuration GUI to cause generation of a new alarm configuration file to replace an existing alarm configuration file associated with a function block identifier.

In FIG. 5A, an example initial GUI 560A is illustrated that includes a function block search entry field 561A via which a user can enter (e.g., type) some or all of a function block identifier being sought. The function block resolver 134 can perform a search for matching function block identifier(s) based on entry of character(s) in the search entry field 561A. The initial GUI 460A also includes selectable options 562A, 563A, and 564A. Selection of selectable option 562A can cause presentation of only function block identifiers with unconfigured alarms and/or can cause the search (performed based on input at function block search entry field 561A) to be restricted to only function block identifiers with unconfigured alarms. Selection of selectable option 563A can cause presentation of all function block identifiers and/or can cause the search (performed based on input at function block search entry field 561A) to not be restricted to any subset of function block identifiers. Selection of selectable option 564A can cause presentation of only function block identifiers with recent changes to their alarms and/or can cause the search (performed based on input at function block search entry field 561A) to be restricted to only function block identifiers with recent changes. Optionally, selection of selectable option 564A causes presentation of an entry field via which a user can specify a criterion for recency.

In FIG. 5B, a further GUI 560B is illustrated that includes a function block search entry field 561B that has been updated to reflect a resolved function block identifier of "FT202.PV". For example, "FT202.PV" can be resolved by the function block resolver 134 based on a search, for matching function block identifier(s), performed based on entry of character(s) in the search entry field 561A at the GUI 560A of FIG. 5A. As another example, "FT202.PV" can be resolved by the function block resolver 134 based on a user selecting selectable option 563A, then selecting "FT202.PV" from a list that is displayed in response to that selection.

The function block identifier "FT202.PV" is one that is already stored, in alarms database 125, in association with existing alarm configuration files. The parameter(s) resolver 136 can access alarms database 125 to determine those existing associations and, as a result, cause GUI module 138 to render selectable GUI elements that correspond to the existing alarm configuration files. Namely, a first selectable GUI element 565B1 that corresponds to a first alarm configuration file stored in association with "FT202.PV", a second selectable GUI element 565B2 that corresponds to a second alarm configuration file stored in association with "FT202.PV", and a third selectable GUI element 565B3 that corresponds to a third alarm configuration file stored in association with "FT202.PV". Any one of the selectable GUI elements 565B1-3 can be selected to enable editing of the corresponding alarm configuration file and generation of a new alarm configuration file to replace the existing alarm configuration file. For example, FIGS. 5C and 5D illustrate further GUIs 560C and 560D that can occur in response to a user selecting first selectable GUI element 565B1.

The further GUI 560B also includes a create a new alarm selectable GUI element 566B that, if selected will enable creation of a new alarm configuration file to associate with the function block identifier. Notably, such creation can be restricted to only alarm(s) that don't conflict with the existing alarm configuration files, such as those of a different alarm type and/or that specify condition(s) for different variable(s) (besides "Input V1"). In some implementations, a new alarm selectable GUI element can be omitted when, for example, it is determined that there are not any additional alarm(s) that don't conflict with the existing alarm configuration files. This can force a user to modify an existing alarm configuration file to prevent creation of a conflicting alarm configuration file.

The further GUI 560B also includes a GUI element 567B1, that includes the DCN identifier ("QR22") of the DCN that implements alarm monitoring utilizing the function block corresponding to "FT202.PV". The DCN identifier can be obtained, from alarms database 125, based on being stored in association with the function block identifier "FT202.PV" (e.g., based on a prior alarm configuration request that specified "FT202.PV" and "QR22").

Figure 5C:
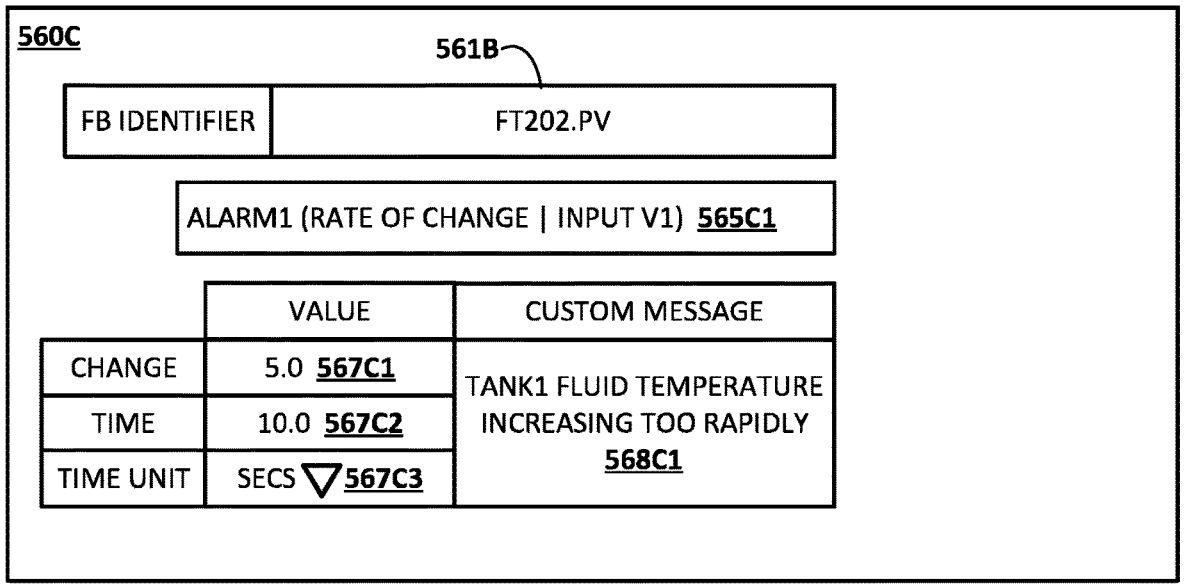
Figure 5D:
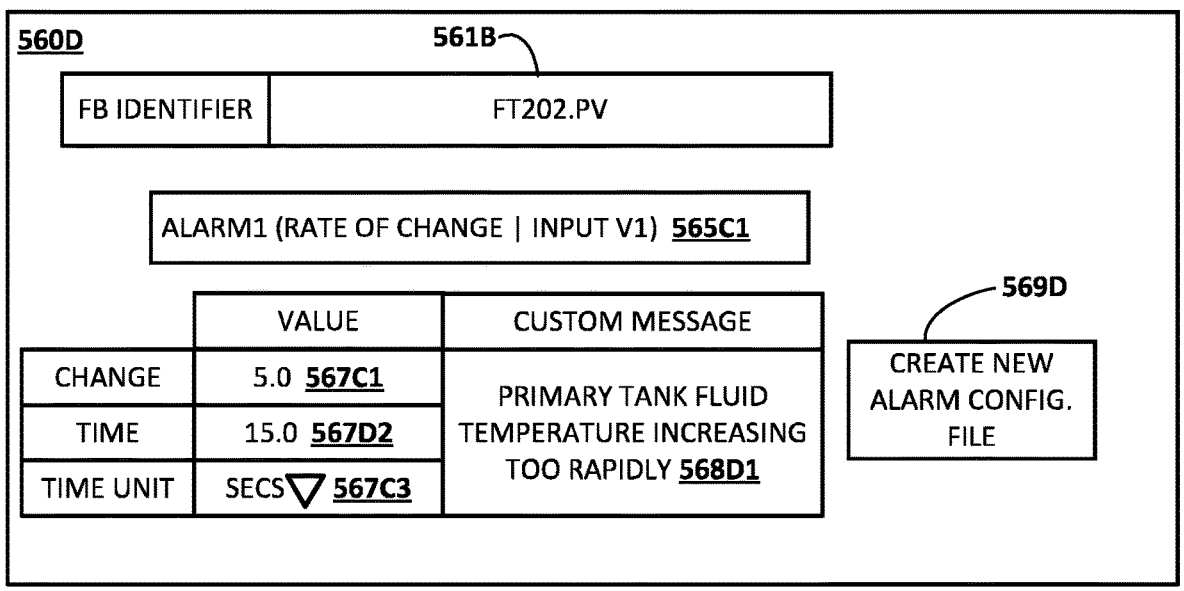

In FIG. 5C, a further GUI 560C is illustrated after the user selected the first selectable GUI element 565B1 in GUI 560B of FIG. 5B. The further GUI 560C includes a graphical interface element 561C that indicates that it is details from the first alarm configuration file, corresponding the selected first selectable GUI element 565B1, that are being displayed and that are editable in further GUI 560C.

The further GUI 560C also includes entry fields 567C1-3 that reflect currently defined values that reflect a rate of change condition for "Input V1". Namely, a current value of "5.0" 567C1 for the amount of change, a current value of "10.0" 567C3 for the specified time and a value of "seconds" 567C3 for the time unit for the specified time. In other words, the current values define that the rate of change alarm should trigger if the value of "Input V1" changes by 5.0 within a 10 second interval. The further GUI 560C also includes entry field 568C1 that reflects a current custom message corresponding to the rate of change condition specified by the currently defined values.

The respective value in each of the entry fields 567C1-3 is editable through interaction with the entry field. For example, entry fields 567C1 and 567C2 can be edited via typed input and entry field 567C3 can be edited through touch or mouse input (e.g., to select, in a drop-down, from other discrete time unit options such as "milliseconds", "minutes", and/or "hours"). The current custom message of entry field 568C1 is also editable.

In FIG. 5D a further GUI 560D is illustrated after the user interacted with entry field 567C2 of GUI 560C of FIG. 5C to alter "10.0" to "15.0" and interacted with entry field 586C1 of GUI 560C of FIG. 5C to replace "Tank 1" with "Primary Tank". Notably, the user elected not to interact with entry fields 567C1 and 567C2, leaving those with the original current values.

In FIG. 5D, a confirmatory interface element 569D is also illustrated. Selection of the confirmatory interface element 569D can cause a new alarm configuration file to be generated and stored, in alarms database 125, in association with the "FT202.PV" function block identifier. Further, it can cause the new alarm configuration file to replace, in alarms database 125, the one that was edited. For example, the one that was edited can be removed from alarms database 125, or can remain in alarms database 125 but marked as "legacy", "no longer in use", or with other flag(s) to prevent its provisions to any DCN for use in active alarm monitoring.

Figure 6:
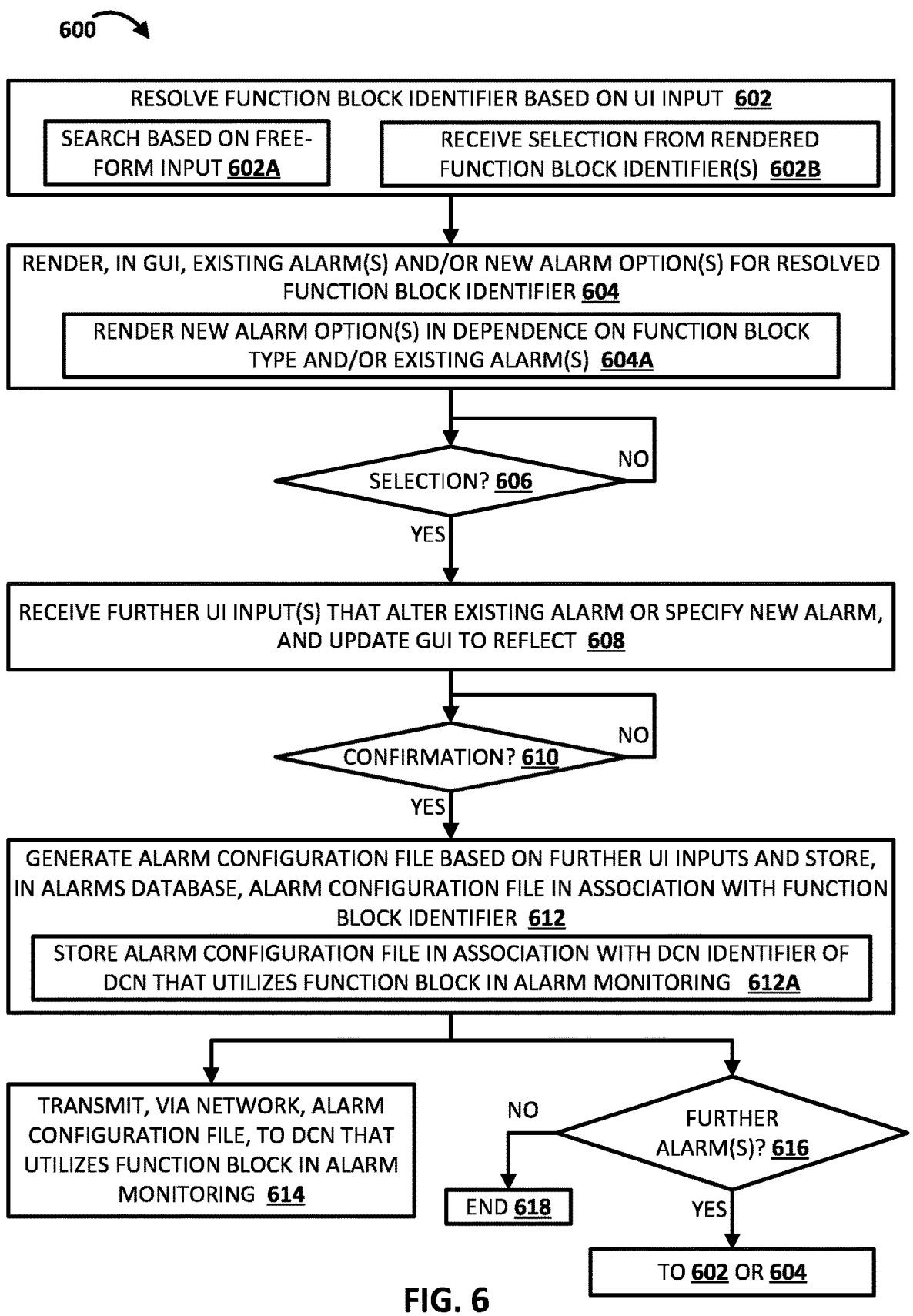
FIG. 6 illustrates an example method of utilizing an alarm configuration GUI in generating an alarm configuration file associated a function block identifier, and transmitting the alarm configuration file to a DCN that utilizes the function block in alarm monitoring.

FIG. 6 illustrates an example method 600 of utilizing an alarm configuration GUI in generating an alarm configuration file associated a function block identifier, and transmitting the alarm configuration file to a DCN that utilizes the function block in alarm monitoring. For convenience, the operations of the flow chart are described with reference to a system that performs the operations. This system can include various components of various computer systems, such as alarm configuration GUI system 130 and/or alarm configuration service 120. Moreover, while operations of method 600 are shown in a particular order, this is not meant to be limiting. One or more operations may be reordered, omitted or added.

At block 602, the system resolves a function block identifier based on user interface (UI) input received via an alarm configuration GUI. In some implementations, block 602 can include sub-block 602A and/or sub-block 602B.

At sub-block 602A, the system resolves the function block identifier based on a search that is based on free-form UI input provided via the alarm configuration GUI. At sub-block 602B, the system resolves the function block identifier based on receiving a selection UI input that selects a function block identifier from multiple rendered function block identifiers. In some implementations, sub-block 602A can be performed without performing sub-block 602B. For example, the system can resolve a single function block identifier from a search that is based on the free-form UI input provided via the alarm configuration GUI. In some implementations, sub-block 602A and sub-block 602B are both performed. For example, the system can identify multiple function block identifiers from a search that is based on the free-form UI input provided via the alarm configuration GUI, each of those can be rendered, and a single one resolved based on a selection of one of those being rendered. In some implementations, sub-block 602B can be performed without performing sub-block 602A. For example, function block identifiers can be rendered without any search, and one of those resolved based on being selected.

At block 604, the system renders, in the alarm configuration GUI, existing alarms (if any) for the resolved function block identifier and/or new alarm option(s) (if any) for the resolved function block identifier. For example, if there are not any existing alarms for the resolved function block identifier, the system can render only option(s) for new alarm(s) to be created. In some implementations, block 604 can include sub-block 604A, in which the system renders new alarm option(s) in dependence on a function block type, of the function block identifier resolved in block 602 and/or in dependence on existing alarm(s) (if any) for the resolved function block identifier. For example, the system can render only new alarm option(s) that are of type(s) that are compatible with a function block type of the function block identifier resolved in block 602. As another example, the system can render only new alarm option(s) that do not conflict with existing alarm(s).

At block 606, the system monitors for a selection of one of the rendered alarm(s) (e.g., a rendered existing alarm or rendered alarm option). If, at block 606, the system detects a selection of one of the rendered alarms, the system proceeds to block 608 based on the selected alarm.

At block 608, the system receives further UI input(s) that alter an existing alarm (i.e., when an existing alarm was selected at block 606) or that specify a new alarm (i.e., when a new alarm option was selected at block 606), and updates the GUI to reflect the alteration(s) of the existing alarm or the specification of the new alarm.

At block 610, the system monitors for confirmation of the alteration(s) to the existing alarm or the specification of the new alarm. For example, the system can monitor for user selection of a confirmation interface element rendered in the alarm configuration GUI, user speaking of "done" or "confirm", and/or for other confirmatory user input(s). If, at block 610, the system detects confirmation of the alteration to the existing alarm or the specification of the new alarm, the system proceeds to block 612.

At block 612, the system generates an alarm configuration file based on the further UI inputs received at block 608 and stores, in an alarms database, the generated alarm configuration file in association with the resolved function block identifier. In some implementations, the alarm configuration file can also be stored, in an alarms database, in association with metadata related to creation of the alarm configuration file. For example, the metadata can include a date of creation, a time of creation, and/or a user name corresponding to the user that created the alarm configuration file (e.g., a user name utilized in authentication).

In some implementations, block 612 includes sub-block 612A, in which the system stores the alarm configuration file in association with a DCN identifier of a DCN that utilizes the function block in alarm monitoring. This can include a direct association of the DCN identifier and the alarm configuration file or an indirect association via an association of the alarm configuration file to the function block identifier and an association of the function block identifier to the DCN identifier. As described herein, the association of the function block identifier to the DCN identifier can be based on, for example, a prior alarm configuration request, from the DCN, that included both the function block identifier and the DCN identifier.

At block 614, the system transmits the alarm configuration file via a network and to a DCN that utilizes the function block (corresponding to the resolved function block identifier) in alarm monitoring.

At block 616, the system determines if further interaction(s), of a user via the GUI, indicate a desire to define further alarm(s) for the function block and/or for other function block(s). If so, the system proceeds back to block 602 (e.g., if desire to define further alarm(s) for other function block(s)) or block 604 (e.g., if desire to define further alarm(s) for the same function block). If not, the system can proceed to block 618 and the iteration of method 600 can end.

Figure 7:
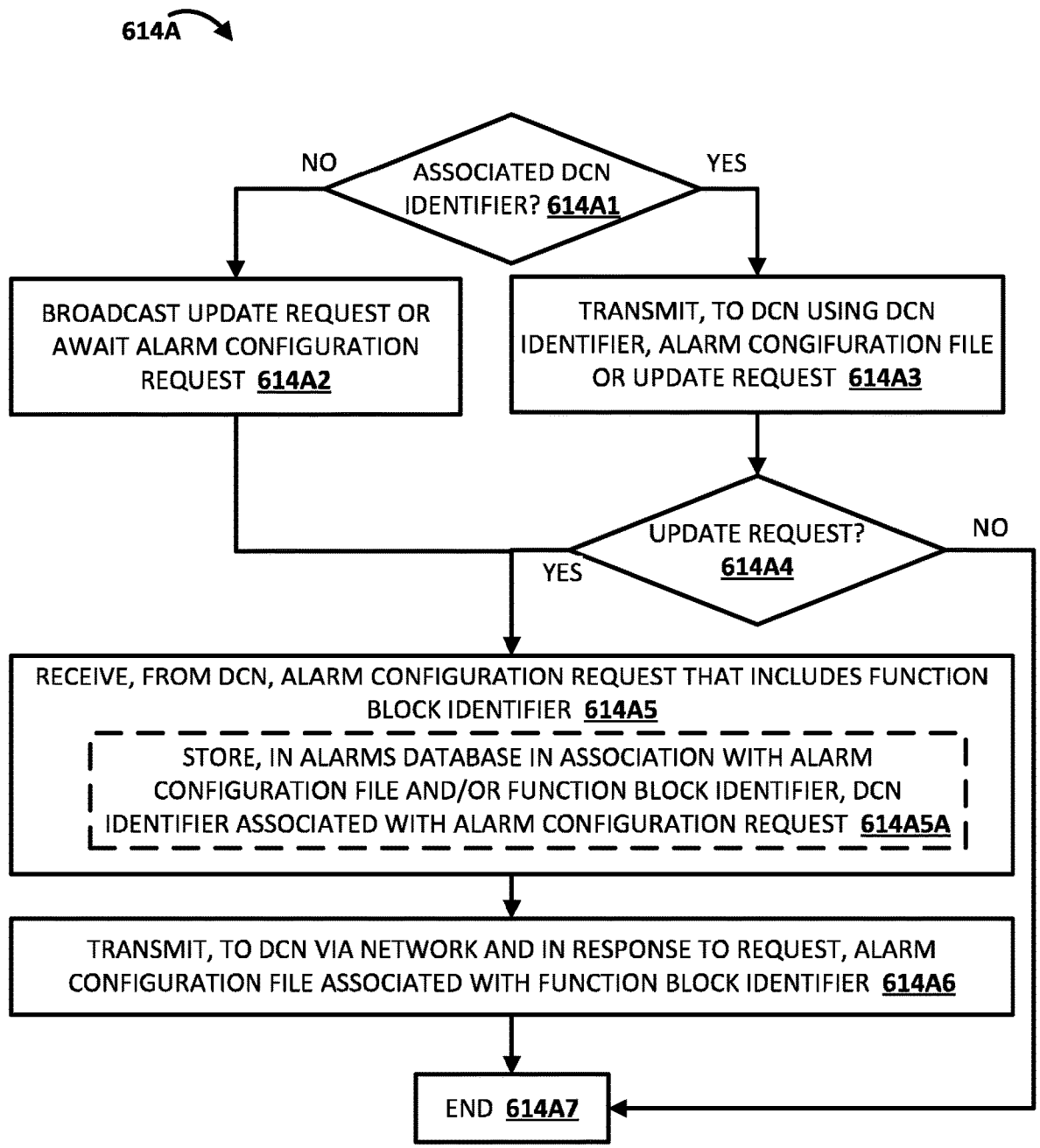
FIG. 7 illustrates an example of implementations of block 614 of FIG. 6.

FIG. 7 illustrates an example implementation 614A of block 614 of FIG. 6.

At block 614A1, the system determines whether there is an associated DCN identifier stored in association with the function block identifier in the alarms database.

If so, at block 614A3 the system transmits, to the DCN and using the DCN identifier, the alarm configuration file (i.e., proactively and unilaterally) or transmits, to the DCN and using the DCN identifier, an update request. The system then proceeds to block 614A4 and determines whether the alarm configuration file or the update request was transmitted at block 614A3. If the alarm configuration file was transmitted, the system proceeds to block 614A7 and the iteration of implementation 614A ends. If the update request was instead transmitted, the system proceeds to block 614A5. In some implementations, when the update request is transmitted at block 614A3 it can be transmitted directly to the DCN (and not to any other DCNs) and can be a message that informs the DCN that an updated alarm configuration file is available—and can, when received at the DCN, be an alarm configuration condition (e.g., can lead to a "yes" determination in block 802 of method 800).

If the decision at block 614A1 is no, at block 614A2 the system broadcasts an update request to all DCNs of the network which, when received at the DCNs, can be an alarm configuration condition for the DCNs. Alternatively, at block 614A2 the system can instead wait for the DCN, associated with the function block identifier, to transmit an alarm configuration request responsive to an alternative alarm configuration condition(s). In some implementations, the system can, at block 614A2, dynamically determine whether to broadcast the update request or to instead wait for an alarm configuration request from a corresponding DCN responsive to the corresponding DCN detecting alternative condition(s). In some of those implementations, the dynamic determination can be based on a priority of the alarm configuration file, such as a severity level explicitly defined in the alarm configuration file. For example, the dynamic determination can be to broadcast the update request if the severity level is a top priority level, otherwise wait for an alarm configuration request that is responsive to a corresponding DCN detecting alternative condition(s). In some of those implementations, the dynamic determination can additionally or alternatively be based on network conditions of the process automation network and/or determined or estimated current workload of DCN(s) of the process automation system. It is noted that, in some implementations the update request optionally sent in block 614A3 can optionally vary from the update request of block 614A2, and can be processed differently by receiving DCN(s) as a result. For example, a DCN can act as soon as possible on an update request of block 614A3, but can optionally delay acting (e.g., based on a randomly selected delay duration) based on an update request of block 614A2.

At block 614A5, the system receives, from a DCN, an alarm configuration request that includes the resolved function block identifier, of block 602 (FIG. 6), that is associated in the alarms database with the alarm configuration file generated at block 612 (FIG. 6). The DCN may have transmitted the alarm configuration request, of block 614A5, responsive to receiving an update request transmitted at block 614A3 or broadcast at block 614A2.

In some implementations, block 614A5 includes sub-block 614A5A. At sub-block 614A5A, the system stores, in the alarm database and in association with the retrieved alarm configuration file and/or the function block identifier of the request, a DCN identifier associated with the alarm configuration request. The system can also store the DCN identifier in association with any additional retrieved alarm configuration file(s) and/or additional function block identifier(s) of the request. The DCN identifier is an identifier of the DCN that transmitted the alarm configuration request. The DCN identifier can be included in the alarm configuration request, or can be determined from e.g., a transmission header associated with the request. The DCN identifier can optionally be a network addressable identifier such as an IP address or a MAC address. In various implementations, when the DCN identifier is stored in association with the alarm configuration file in the database, the DCN identifier can thereafter be utilized for various purposes, such as those described herein.

At block 614A6, the system transmits, to the DCN via the network and in response to the request, the alarm configuration file. The system transmits the alarm configuration file based on it being stored, in the alarms database, in association with the function block identifier of the alarm configuration request. The system then proceeds to block 614A7.

Figure 8:
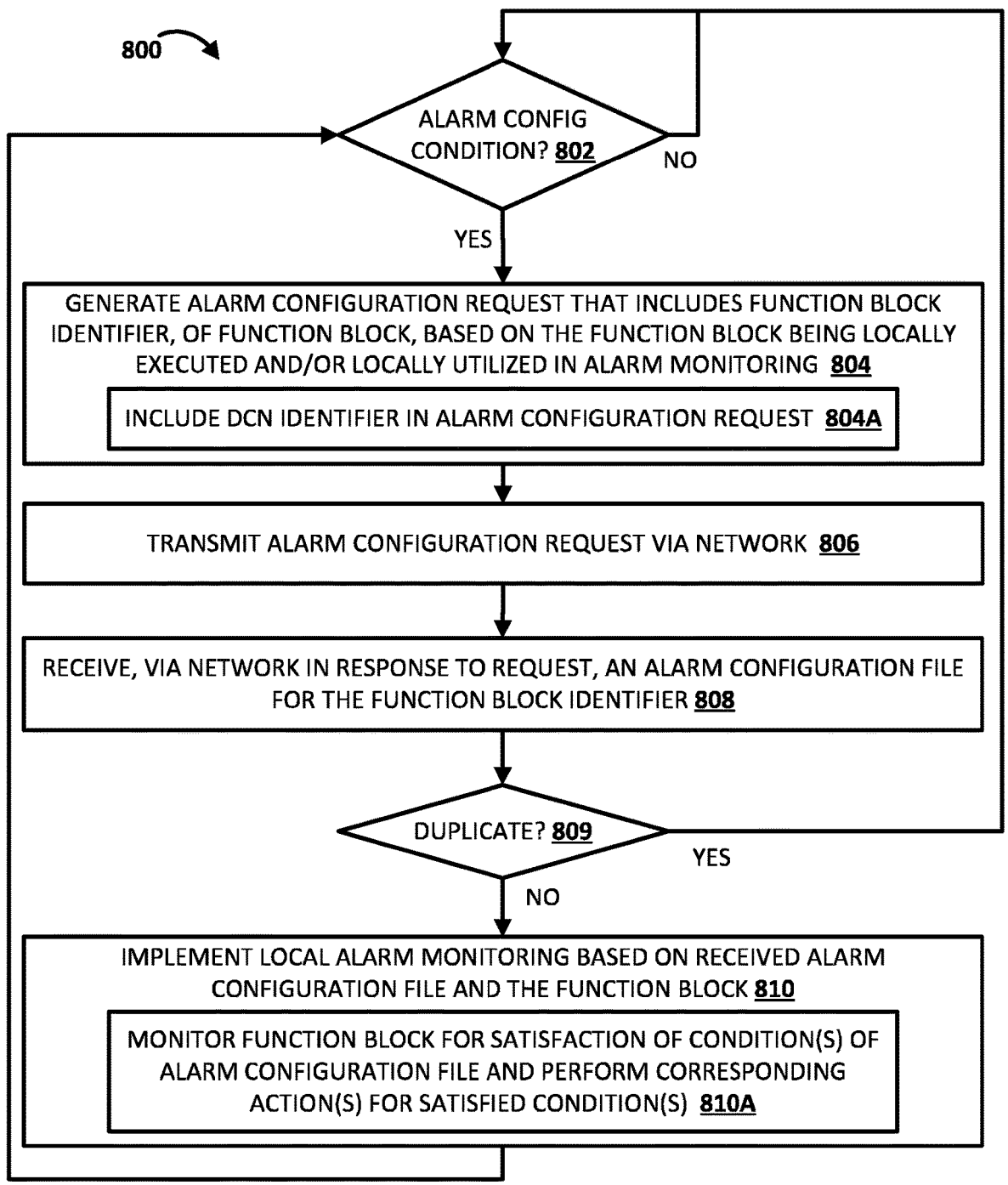
FIG. 8 illustrates an example method of generating and transmitting an alarm configuration request, receiving an alarm configuration file in response, and implementing local alarm monitoring based on the received alarm configuration file.

FIG. 8 is a flowchart illustrating an example method 800 of generating and transmitting an alarm configuration request, receiving an alarm configuration file in response, and implementing local alarm monitoring based on the received alarm configuration file. For convenience, the operations of the flow chart are described with reference to a system that performs the operations. This system can include various components of various computer systems, such as any one of DCNs 110A-N. Moreover, while operations of method 800 are shown in a particular order, this is not meant to be limiting. One or more operations may be reordered, omitted or added.

At block 802, the system monitors for occurrence of an alarm configuration condition. If an alarm configuration condition is detected at block 802, the system proceeds to block 804. In some implementations, at block 802 the system monitors for occurrence of any one of multiple conditions, such as determining it is newly commissioned, determining it has been powered up, determining that its alarm engine is assigned to monitor function block(s) but that monitoring not being currently active, determining that is has been more than a threshold duration of time since it last issued an alarm configuration request, and/or receiving an update request from an alarm configuration service (e.g., from push module 126).

At block 804, the system generates an alarm configuration request that includes a function block identifier, of a function block, based on the function block being locally executed and/or being locally utilized in alarm monitoring. For example, the system can include the function block identifier based on it being assigned for use by an alarm engine, of the system, in alarm monitoring. In some implementations, the alarm configuration request includes multiple function block identifiers, of multiple function blocks, based on them each being locally executed and/or being locally utilized in alarm monitoring.

At block 806, the system transmits the alarm configuration request, generated at block 804, via a process automation network.

At block 808, the system receives, via the process automation network and in response to the request, an alarm configuration file for the function block identifier. At block 808, the system can optionally receive multiple alarm configuration files when, for example, the alarm configuration request includes multiple function block identifiers. In some implementations, the alarm configuration file(s) are received, at block 808, responsive to block 614A6, of implementation 614A of FIG. 7, being performed.

At block 809, the system determines whether all of the received alarm configuration files are duplicates. That is, whether all of the received alarm configuration files are already locally stored and being locally utilized by the alarm engine of the system in performing alarm monitoring. If so, the system proceeds back to block 802 and monitors for occurrence of another alarm configuration condition. If not, the system proceeds to block 810.

At block 810, the system implements local alarm monitoring based on the received alarm configuration file (if not a duplicate) and the function block, and based on any additional received alarm configuration file(s) (if not duplicate(s) and corresponding function block(s).

Block 810 can optionally include sub-block 810A. At sub-block 810A, in implementing local alarm monitoring based on the receive alarm configuration file and the function block, the system monitors the function block (e.g., during execution of the function block) for satisfaction of condition(s) of the alarm configuration file and, in response to detecting satisfaction of the condition(s), perform(s) corresponding action(s) for the satisfied condition(s).

Figure 9:
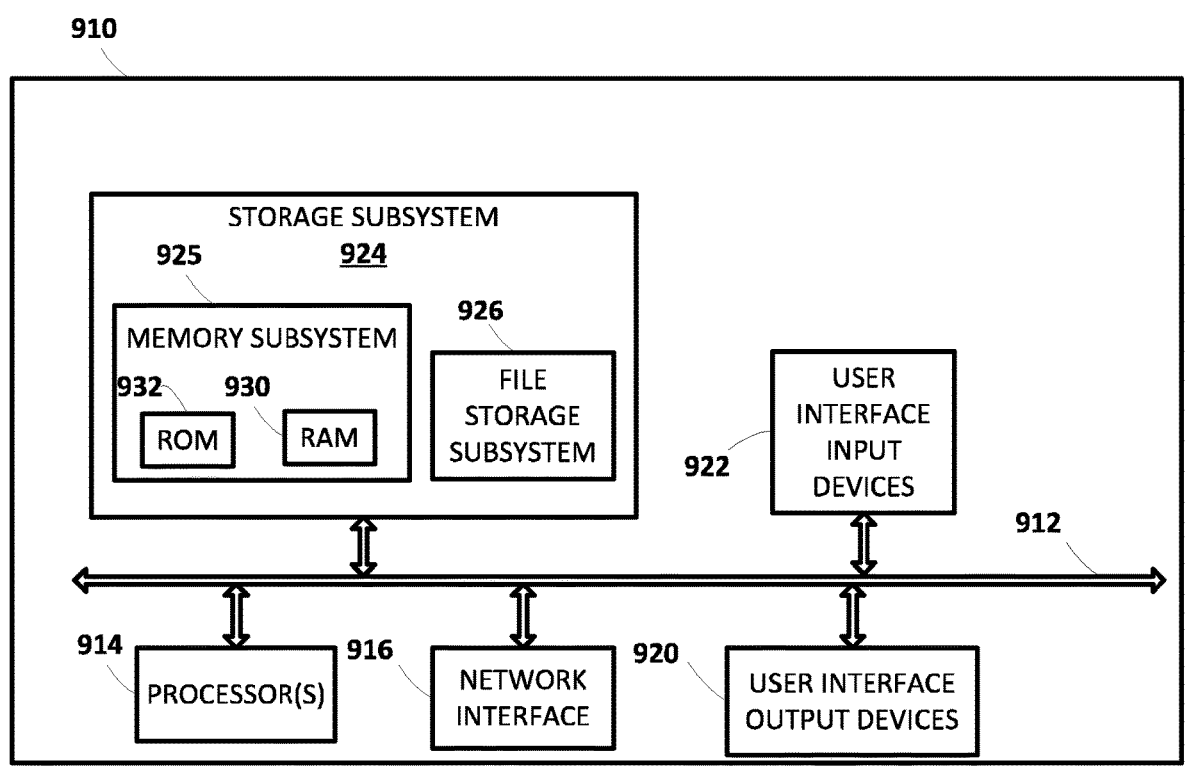
FIG. 9 schematically illustrates an example computer architecture on which selected aspects of the present disclosure can be implemented.

FIG. 9 is a block diagram of an example computing device 910 that may optionally be utilized to perform one or more aspects of techniques described herein. For example, computing device 910 is an example of a computing device that can implement all or parts of alarm configuration service and/or, optionally, all or parts of some DCN(s). Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods of FIGS. 6-8, as well as to implement various components depicted in FIGS. 1-3.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations a method is provided that includes receiving, via an alarm configuration interface, one or more instances of user interface input that collectively define: one or more conditions to be used for a process automation alarm, and a function block identifier of a function block, of a process automation system, via which the conditions are to be monitored. The method further includes, responsive to receiving the instances of user interface input, generating an alarm configuration file that specifies the conditions, and storing, in a database, the alarm configuration file in association with the function block identifier for the function block. The method further includes subsequent to storing, in the database, the alarm configuration file in association with the function block identifier: determining that a distributed control node (DCN) of the process automation system locally utilizes the function block, identified by the function block identifier, in alarm monitoring. The method further includes retrieving the alarm configuration file from the database based on it being stored in association with the function block identifier, and transmitting, via a network of the process automation system, the retrieved alarm configuration file to the DCN in response to determining that the DCN utilizes the process automation function block, identified by the function block identifier, in alarm monitoring. Transmitting the retrieved alarm configuration file causes the DCN to implement alarm monitoring that conforms to the retrieved alarm configuration file.

These and other implementations of the technology disclosed herein can include one or more of the following features.

In some implementations, determining that the DCN locally utilizes the function block in alarm monitoring includes receiving, via the network of the process automation system, an alarm configuration request transmitted by the DCN, and determining that the DCN locally utilizes the function block in alarm monitoring responsive to the alarm configuration request including the function block identifier. In those implementations, retrieving the alarm configuration file from the database and transmitting the retrieved alarm configuration file to the DCN are responsive to receiving the alarm configuration request. In some versions of those implementations, the alarm configuration request further includes a DCN identifier that uniquely identifies the DCN relative to all other DCNs of the process automation system and the method further includes, responsive to receiving the alarm configuration request and the alarm configuration request including the function block identifier and the DCN identifier, storing, in the database, the DCN identifier in association the function block identifier. In some of those versions, the method further includes: receiving, via the alarm configuration interface, one or more additional instances of user interface input that collectively define: one or more alternate conditions to be used for the process automation alarm, and the function block identifier; responsive to receiving the additional instances of user interface input: generating an alternate alarm configuration file that specifies the alternate conditions, storing, in the database, the alternate alarm configuration file in association with the function block identifier, and removing, from the database, the association of the alarm configuration file with the function block identifier; and subsequent to storing, in the database, the alternate alarm configuration file in association with the function block identifier and based on the database storing the DCN identifier in association with the function block identifier and storing the alternate alarm configuration file in association with the function block identifier: transmitting, via the network and using the DCN identifier, the alternate alarm configuration file to the DCN. Transmitting the alternate alarm configuration file causes the DCN to implement alarm monitoring that conforms to the alternate alarm configuration file in lieu of implementing alarm monitoring that conforms to the alarm configuration file. Optionally, transmitting the alternate alarm configuration file includes unilaterally transmitting the retrieved configuration file to the DCN using the DCN identifier.

In some implementations, receiving, via the alarm configuration interface, the instances of user interface input that collectively define the one or more conditions and the function block identifier, includes: receiving one or more initial of the instances of user interface input that define the function block identifier; and receiving one or more subsequent of the instances of user interface input that define the conditions to be used for the process automation alarm. In some versions of those implementations, the method further includes: identifying the function block identifier based on the initial of the instances of user interface input; generating graphical output that is dependent on the identification of the function block identifier; and causing the graphical output to be rendered via the alarm configuration interface. The subsequent of the instances of user interface input are received via interaction with the graphical output that is dependent on the identification of the function block identifier. In some of those versions, generating graphical output that is dependent on the identification of the function block identifier includes: generating the graphical output in dependence on a function block type that is specified by the function block identifier. In some of those versions, generating graphical output that is dependent on the identification of the function block identifier includes: identifying current conditions for the process automation alarm based on a current alarm configuration file stored in association with the function block identifier in the database; and generating the graphical output to reflect the identified current conditions for the process automation alarm.

In some implementations, determining that the DCN locally utilizes the function block in alarm monitoring includes: determining, based on a pre-stored association of the DCN to the function block, that the DCN locally utilizes the function block in alarm monitoring. In some versions of those implementations, transmitting the retrieved alarm configuration file to the DCN in response to determining that the DCN utilizes the process automation function block, includes unilaterally transmitting the retrieved configuration file to the DCN.

In some implementations, transmitting the retrieved alarm configuration file to the DCN in response to determining that the DCN utilizes the process automation function block, includes: transmitting, to the DCN, an initial communication that indicates availability of an updated alarm configuration file; receiving, from the DCN and after the initial communication, an alarm configuration request from the DCN; and transmitting the retrieved alarm configuration file to the DCN in response to receiving the alarm configuration request from the DCN.

In some implementations, the function block identifier is specific to the function block and is not assigned to any other function block of the process automation system.

In some implementations, the method further includes authenticating a user that provides the one or more instance of user interface input. In some of those implementations, storing, in the database, the alarm configuration file in association with the function block identifier is further in response to authenticating the user.

In some implementations, a method is provided that includes receiving, via an alarm configuration interface, one or more initial instances of user interface input and selecting, based on the initial instances of user interface input and from a plurality of function block identifiers for a process automation system, a function block identifier for a function block. The method further includes generating graphical output that is dependent on the selection of the function block identifier, causing the graphical output to be rendered via the alarm configuration interface, and receiving, via interaction with the graphical output that is dependent on the identification of the function block identifier, one or more subsequent instances of user interface input. The method further includes determining, based on the subsequent instances of user interface input, one or more conditions to be used for a process automation alarm. The method further includes, in response to determining the conditions: storing, in a database, an alarm configuration file that specifies the conditions, and an association of the alarm configuration file with the function block identifier; and transmitting, via a network of the process automation system, the alarm configuration file to a distributed control node (DCN) in response to determining that the DCN utilizes the function block, identified by the function block identifier, in alarm monitoring. Transmitting the retrieved alarm configuration file causes the DCN to implement alarm monitoring that conforms to the alarm configuration file.

These and other implementations of the technology disclosed herein can include one or more of the following features.

In some implementations, generating the graphical output that is dependent on the selection of the function block identifier includes generating the graphical output in dependence on a function block type that is specified by the function block identifier. In some versions of those implementations, generating in dependence on the function block type that is specified by the function block identifier includes generating the graphical output to include only alarm types that are compatible with the function block type. In some of those versions, generating the graphical output to include only alarm types that are compatible with the function block type includes including, in an alarm type drop down menu, descriptors for only the alarm types that are compatible with the function block type.

In some implementations, generating the graphical output that is dependent on the selection of the function block identifier includes: identifying the function block identified by the function block identifier; identifying one or more process variables included in the function block; and generating the graphical output to include the one or more process variables included in the function block.

In some implementations, generating the graphical output that is dependent on the selection of the function block identifier includes: identifying current conditions for the process automation alarm based on a current alarm configuration file stored in association with the function block identifier in the database; and generating the graphical output to reflect the identified current conditions for the process automation alarm.

In some implementations, a system is provided that includes a database, one or more network interfaces, memory storing instructions, and one or more processors. The processor(s) are operable to execute the instructions to: receive, via an alarm configuration interface, instances of user interface input that collectively define one or more conditions to be used for a process automation alarm, and a function block identifier of a function block via which the conditions are to be monitored. The processor(s), in executing the instructions, are further to, responsive to receiving the instances of user interface input: generate an alarm configuration file that specifies the conditions, and store, in the database, the alarm configuration file in association with the function block identifier for the function block. The processor(s), in executing the instructions, are further to, subsequent to storing, in the database, the alarm configuration file in association with the function block identifier: determine that a distributed control node (DCN) locally utilizes the function block, identified by the function block identifier, in alarm monitoring; and transmit, using the one or more network interfaces and via a process automation network, the alarm configuration file to the DCN in response to: determining that the DCN utilizes the process automation function block, identified by the function block identifier, in alarm monitoring, and the alarm configuration file being stored in association with the function block identifier. Transmitting the retrieved alarm configuration file causes the DCN to implement alarm monitoring that conforms to the retrieved alarm configuration file.

What is claimed is:

1. A method comprising:
   receiving, via an alarm configuration interface, one or more instances of user interface input that collectively define:
      one or more conditions to be used for a process automation alarm, and
      a function block identifier of a function block, of a process automation system, via which the conditions are to be monitored;
   responsive to receiving the instances of user interface input:
      generating an alarm configuration file that specifies the conditions, and
      storing, in a database, the alarm configuration file in association with the function block identifier for the function block;
   subsequent to storing, in the database, the alarm configuration file in association with the function block identifier:
      determining that a distributed control node (DCN) of the process automation system locally utilizes the function block, identified by the function block identifier, in alarm monitoring;
      retrieving the alarm configuration file from the database based on it being stored in association with the function block identifier; and
      transmitting, via a network of the process automation system, the retrieved alarm configuration file to the DCN in response to determining that the DCN utilizes the process automation function block, identified by the function block identifier, in alarm monitoring,
         wherein transmitting the retrieved alarm configuration file causes the DCN to implement alarm monitoring that conforms to the retrieved alarm configuration file.

2. The method of claim 1, wherein determining that the DCN locally utilizes the function block in alarm monitoring comprises:
   receiving, via the network of the process automation system, an alarm configuration request transmitted by the DCN, and
   determining that the DCN locally utilizes the function block in alarm monitoring responsive to the alarm configuration request including the function block identifier; and
   wherein retrieving the alarm configuration file from the database and transmitting the retrieved alarm configuration file to the DCN are responsive to receiving the alarm configuration request.

3. The method of claim 2, wherein the alarm configuration request further includes a DCN identifier that uniquely identifies the DCN relative to all other DCNs of the process automation system and further comprising:
   responsive to receiving the alarm configuration request and the alarm configuration request including the function block identifier and the DCN identifier:
      storing, in the database, the DCN identifier in association with the function block identifier.

4. The method of claim 3, further comprising:
   receiving, via the alarm configuration interface, one or more additional instances of user interface input that collectively define:
      one or more alternate conditions to be used for the process automation alarm, and
      the function block identifier;
   responsive to receiving the additional instances of user interface input:

generating an alternate alarm configuration file that specifies the alternate conditions, storing, in the database, the alternate alarm configuration file in association with the function block identifier, and removing, from the database, the association of the alarm configuration file with the function block identifier;

subsequent to storing, in the database, the alternate alarm configuration file in association with the function block identifier and based on the database storing the DCN identifier in association with the function block identifier and storing the alternate alarm configuration file in association with the function block identifier:

transmitting, via the network and using the DCN identifier, the alternate alarm configuration file to the DCN, wherein transmitting the alternate alarm configuration file causes the DCN to implement alarm monitoring that conforms to the alternate alarm configuration file in lieu of implementing alarm monitoring that conforms to the alarm configuration file.

5. The method of claim 4, wherein transmitting the alternate alarm configuration file comprises unilaterally transmitting the retrieved configuration file to the DCN using the DCN identifier.

6. The method of claim 1, wherein receiving, via the alarm configuration interface, the instances of user interface input that collectively define the one or more conditions and the function block identifier, comprises:

receiving one or more initial of the instances of user interface input that define the function block identifier; and receiving one or more subsequent of the instances of user interface input that define the conditions to be used for the process automation alarm.

7. The method of claim 6, further comprising:

identifying the function block identifier based on the initial of the instances of user interface input;

generating graphical output that is dependent on the identification of the function block identifier; and causing the graphical output to be rendered via the alarm configuration interface;

wherein the subsequent of the instances of user interface input are received via interaction with the graphical output that is dependent on the identification of the function block identifier.

8. The method of claim 7, wherein generating graphical output that is dependent on the identification of the function block identifier comprises:

generating the graphical output in dependence on a function block type that is specified by the function block identifier.

9. The method of claim 7, wherein generating graphical output that is dependent on the identification of the function block identifier comprises:

identifying current conditions for the process automation alarm based on a current alarm configuration file stored in association with the function block identifier in the database; and generating the graphical output to reflect the identified current conditions for the process automation alarm.

10. The method of claim 1, wherein determining that the DCN locally utilizes the function block in alarm monitoring comprises:

determining, based on a pre-stored association of the DCN to the function block, that the DCN locally utilizes the function block in alarm monitoring.

11. The method of claim 10, wherein transmitting the retrieved alarm configuration file to the DCN in response to determining that the DCN utilizes the process automation function block, comprises:

unilaterally transmitting the retrieved configuration file to the DCN.

12. The method of claim 1, wherein transmitting the retrieved alarm configuration file to the DCN in response to determining that the DCN utilizes the process automation function block, comprises:

transmitting, to the DCN, an initial communication that indicates availability of an updated alarm configuration file;

receiving, from the DCN and after the initial communication, an alarm configuration request from the DCN; and transmitting the retrieved alarm configuration file to the DCN in response to receiving the alarm configuration request from the DCN.

13. The method of claim 1, wherein the function block identifier is specific to the function block and is not assigned to any other function block of the process automation system.

14. The method of claim 1, further comprising:

authenticating a user that provides the one or more instance of user interface input;

wherein storing, in the database, the alarm configuration file in association with the function block identifier is further in response to authenticating the user.

15. A method comprising:

receiving, via an alarm configuration interface, one or more initial instances of user interface input;

selecting, based on the initial instances of user interface input and from a plurality of function block identifiers for a process automation system, a function block identifier for a function block;

generating graphical output that is dependent on the selection of the function block identifier;

causing the graphical output to be rendered via the alarm configuration interface;

receiving, via interaction with the graphical output that is dependent on the identification of the function block identifier, one or more subsequent instances of user interface input;

determining, based on the subsequent instances of user interface input, one or more conditions to be used for a process automation alarm;

in response to determining the conditions:

storing, in a database, an alarm configuration file that specifies the conditions, and an association of the alarm configuration file with the function block identifier; and transmitting, via a network of the process automation system, the alarm configuration file to a distributed control node (DCN) in response to determining that the DCN utilizes the function block, identified by the function block identifier, in alarm monitoring, wherein transmitting the retrieved alarm configuration file causes the DCN to implement alarm monitoring that conforms to the alarm configuration file.

16. The method of claim 15, wherein generating the graphical output that is dependent on the selection of the function block identifier comprises:

generating the graphical output in dependence on a function block type that is specified by the function block identifier.

17. The method of claim 16, wherein generating in dependence on the function block type that is specified by the function block identifier comprises:

generating the graphical output to include only alarm types that are compatible with the function block type.

18. The method of claim 17, wherein generating the graphical output to include only alarm types that are compatible with the function block type comprises including, in an alarm type drop down menu, descriptors for only the alarm types that are compatible with the function block type.

19. The method of claim 15, wherein generating the graphical output that is dependent on the selection of the function block identifier comprises:

identifying the function block identified by the function block identifier;

identifying one or more process variables included in the function block; and generating the graphical output to include the one or more process variables included in the function block.

20. The method of claim 15, wherein generating the graphical output that is dependent on the selection of the function block identifier comprises:

identifying current conditions for the process automation alarm based on a current alarm configuration file stored in association with the function block identifier in the database; and generating the graphical output to reflect the identified current conditions for the process automation alarm.

21. A system comprising:
a database;
one or more network interfaces;
memory storing instructions;
one or more processors operable to execute the instructions to:
receive, via an alarm configuration interface, instances of user interface input that collectively define:
one or more conditions to be used for a process automation alarm, and
a function block identifier of a function block via which the conditions are to be monitored;
responsive to receiving the instances of user interface input:
generate an alarm configuration file that specifies the conditions, and
store, in the database, the alarm configuration file in association with the function block identifier for the function block;
subsequent to storing, in the database, the alarm configuration file in association with the function block identifier:
determine that a distributed control node (DCN) locally utilizes the function block, identified by the function block identifier, in alarm monitoring; and
transmit, using the one or more network interfaces and via a process automation network, the alarm configuration file to the DCN in response to:
determining that the DCN utilizes the process automation function block, identified by the function block identifier, in alarm monitoring, and
the alarm configuration file being stored in association with the function block identifier,
wherein transmitting the retrieved alarm configuration file causes the DCN to implement alarm monitoring that conforms to the retrieved alarm configuration file.

\* \* \* \* \*